(12) United States Patent
Watts

(10) Patent No.: US 11,716,984 B2
(45) Date of Patent: Aug. 8, 2023

(54) INSECT TRAPPING DEVICE

(71) Applicant: Kevin Bradley Watts, Toronto (CA)

(72) Inventor: Kevin Bradley Watts, Toronto (CA)

( * ) Notice: Subject to any disclaimer, the term of this patent is extended or adjusted under 35 U.S.C. 154(b) by 0 days.

(21) Appl. No.: 17/432,692

(22) PCT Filed: Feb. 17, 2020

(86) PCT No.: PCT/CA2020/050205
§ 371 (c)(1),
(2) Date: Aug. 20, 2021

(87) PCT Pub. No.: WO2020/168419
PCT Pub. Date: Aug. 27, 2020

(65) Prior Publication Data
US 2022/0039367 A1    Feb. 10, 2022

Related U.S. Application Data

(60) Provisional application No. 62/809,417, filed on Feb. 22, 2019.

(51) Int. Cl.
*A01M 1/22*    (2006.01)
*A01M 1/02*    (2006.01)

(52) U.S. Cl.
CPC ............ *A01M 1/223* (2013.01); *A01M 1/023* (2013.01); *A01M 2200/01* (2013.01)

(58) Field of Classification Search
CPC .......... A01M 1/00; A01M 1/02; A01M 1/023; A01M 1/026; A01M 1/10; A01M 1/103;
(Continued)

(56) References Cited

U.S. PATENT DOCUMENTS 1,024,767 A * 4/1912 Dempster ..................... 43/121
1,944,784 A * 1/1934 Cook ..................... A01M 1/223
43/123

(Continued)

FOREIGN PATENT DOCUMENTS

GB    2463953 A * 4/2010 ............. A01M 1/02
GB    2519881 A * 5/2015 ............ A01M 1/023
(Continued)

OTHER PUBLICATIONS

International Search Report for International Patent Application No. PCT/CA2020/050205; Canadian Intellectual Property Office; Gatineau, Quebec, Canada; dated Jul. 24, 2020.

(Continued)

*Primary Examiner* — Darren W Ark
(74) *Attorney, Agent, or Firm* — Thomas E. Lees, LLC

(57) ABSTRACT

Disclosed herein is an insect trapping device comprising an inner passageway structure defining an inner passageway which, when in an upright orientation, extends from an insect entry zone to an insect delivery zone, the inner passageway structure bordered by at least a pair of opposed insect-facing traction-reducing boundary surface regions to cause an insect to progress toward the insect delivery zone under gravity, with each boundary surface region including at least one of at least a pair of electrode surface regions, wherein each electrode surface region is configured for operative coupling with an electrode power supply to deliver electrical power thereto, the electrode surface regions configured to form an electrocution zone therebetween, with a designated spacing which is configured to initiate electrocution of an instance of the insect descending through the electrocution zone.

10 Claims, 23 Drawing Sheets

(58) Field of Classification Search
CPC ............ A01M 1/12; A01M 1/14; A01M 1/22; A01M 1/223
USPC ................ 43/123, 107, 112, 114, 121, 132.1
See application file for complete search history.

(56) References Cited

U.S. PATENT DOCUMENTS

| | | | | |
|---|---|---|---|---|
| 2,167,978 A * | 8/1939 | Jennerich | ............ | A01M 1/2005 43/121 |
| 2,435,317 A * | 2/1948 | McGrew | .............. | A01M 1/2011 43/121 |
| 2,606,391 A * | 8/1952 | McGrew | .............. | A01M 1/103 43/131 |
| 2,911,756 A * | 11/1959 | Geary | ..................... | A01M 1/20 514/777 |
| 3,816,956 A * | 6/1974 | Sekula | .................... | A01M 1/14 43/114 |
| 4,048,747 A * | 9/1977 | Shanahan | ................ | A01M 1/24 43/114 |
| 4,127,961 A * | 12/1978 | Phillips | ................. | A01M 1/145 43/139 |
| 4,165,577 A * | 8/1979 | Shanahan | .............. | A01M 1/223 43/99 |
| 4,186,512 A * | 2/1980 | Berg | ..................... | A01M 1/223 43/112 |
| 4,263,740 A * | 4/1981 | Hemsarth | ............... | A01M 1/14 43/121 |
| 4,395,842 A * | 8/1983 | Margulies | ............... | A01M 1/14 43/121 |
| 4,423,564 A * | 1/1984 | Davies | .................... | A01M 1/14 43/121 |
| 4,800,671 A * | 1/1989 | Olson | .................... | A01M 1/18 43/108 |
| 4,876,823 A * | 10/1989 | Brunetti | .................. | A01M 1/14 43/124 |
| 4,914,854 A * | 4/1990 | Zhou | .................... | A01M 1/2011 43/112 |
| 4,959,923 A * | 10/1990 | Aiello | .................... | A01M 1/223 43/112 |
| 5,241,779 A * | 9/1993 | Lee | ......................... | A01M 1/02 43/112 |
| 5,301,458 A * | 4/1994 | Deyoreo | ................. | A01M 1/04 43/112 |
| 5,396,729 A * | 3/1995 | Vejvoda | ................. | A01M 1/026 43/114 |
| 5,454,186 A * | 10/1995 | Gang | .................... | A01M 1/02 43/114 |
| 5,632,115 A * | 5/1997 | Heitman | ............... | A01M 1/223 43/132.1 |
| 5,771,628 A * | 6/1998 | Nobbs | .................. | A01M 1/2011 43/132.1 |
| 5,915,948 A * | 6/1999 | Kunze | .................... | A01M 1/145 43/113 |
| 6,032,406 A * | 3/2000 | Howse | .................. | A01M 1/145 43/107 |
| 6,050,025 A * | 4/2000 | Wilbanks | .............. | A01M 1/223 43/112 |
| 6,134,826 A * | 10/2000 | Mah | ...................... | A01M 1/223 43/99 |
| 6,161,327 A * | 12/2000 | Thomas | ................. | A01M 1/145 43/115 |
| 6,493,986 B1 * | 12/2002 | Nelson | .................. | A01M 1/145 43/113 |
| 6,530,172 B2 * | 3/2003 | Lenz | ....................... | A01M 1/04 43/112 |
| 6,530,173 B2 * | 3/2003 | Meade | .................. | A01M 1/223 43/112 |
| 6,560,918 B2 * | 5/2003 | Nelson | .................... | H05C 3/00 43/112 |
| 6,560,919 B2 * | 5/2003 | Burrows | ............... | A01M 1/145 43/107 |
| 6,564,503 B1 * | 5/2003 | Miyahara | .............. | A01M 1/223 43/112 |
| 6,591,545 B2 * | 7/2003 | Brunet | .................. | A01M 1/023 43/112 |
| 6,594,946 B2 * | 7/2003 | Nolen | .................... | A01M 1/223 43/107 |
| 6,688,035 B1 * | 2/2004 | Shichman | ............... | A01M 1/04 43/107 |
| 6,998,133 B2 * | 2/2006 | Simpson | ................. | A01M 1/02 424/407 |
| 7,234,268 B2 * | 6/2007 | Welch | ..................... | A01M 1/02 43/112 |
| 7,299,587 B1 * | 11/2007 | Metcalfe | ................ | A01M 1/14 43/107 |
| 7,676,985 B1 * | 3/2010 | Perkins | ................... | A01M 1/24 43/58 |
| 7,743,552 B2 * | 6/2010 | Borth | .................. | A01M 1/2022 422/402 |
| 8,319,649 B1 * | 11/2012 | Devane | ................. | A01M 1/026 340/552 |
| 8,789,309 B2 * | 7/2014 | Fabry | .................... | A01M 1/026 43/123 |
| 8,966,812 B2 * | 3/2015 | McKnight | ............. | A01M 1/103 43/107 |
| 8,973,300 B1 * | 3/2015 | Smith | .................... | A01M 1/103 43/132.1 |
| 9,066,511 B2 * | 6/2015 | McKnight | ............. | A01M 1/026 |
| 9,144,233 B2 * | 9/2015 | Snell | ..................... | A01M 1/103 |
| 9,386,763 B2 * | 7/2016 | Vasudeva | .............. | A01M 1/023 |
| 9,585,376 B2 * | 3/2017 | Park | ...................... | A01N 61/00 |
| 9,686,973 B2 * | 6/2017 | Nolen | .................... | A01M 1/026 |
| 10,426,154 B2 * | 10/2019 | Sanford | ................ | A01M 1/103 |
| 10,736,309 B1 * | 8/2020 | Cogley | .................. | A01M 1/223 |
| 2004/0200128 A1 * | 10/2004 | Metcalfe | ............. | A01M 1/106 43/107 |
| 2005/0138858 A1 * | 6/2005 | Lyng | ..................... | A01M 1/103 43/121 |
| 2007/0006519 A1 * | 1/2007 | Gunderman | .......... | A01M 1/223 43/107 |
| 2007/0039236 A1 * | 2/2007 | Geier | .................... | A01M 1/026 43/107 |
| 2008/0060256 A1 * | 3/2008 | Chu | ..................... | A01M 1/223 43/107 |
| 2009/0199457 A1 * | 8/2009 | Grigorov | .............. | A01M 1/026 43/99 |
| 2011/0047860 A1 * | 3/2011 | Black | .................... | A01M 1/103 43/107 |
| 2011/0072712 A1 * | 3/2011 | Black | ...................... | A01M 1/02 43/123 |
| 2011/0113674 A1 * | 5/2011 | Levy | ..................... | A01M 13/003 43/132.1 |
| 2011/0283597 A1 * | 11/2011 | Coventry | ................ | A01M 1/06 43/107 |
| 2012/0012046 A1 * | 1/2012 | Cain | ..................... | A01M 1/026 116/200 |
| 2012/0060406 A1 * | 3/2012 | Schneidmiller | ........ | A01M 1/023 43/107 |
| 2012/0246998 A1 * | 10/2012 | Vasudeva | ............. | A01M 1/023 43/123 |
| 2013/0042520 A1 * | 2/2013 | Snell | ..................... | A01M 29/34 43/121 |
| 2013/0111801 A1 * | 5/2013 | White | .................... | A01M 1/103 43/109 |
| 2013/0180161 A1 * | 7/2013 | Vasudeva | ................ | A01M 1/14 43/123 |
| 2013/0180162 A1 * | 7/2013 | Vasudeva | ............. | A01M 1/103 422/236 |
| 2013/0269238 A1 * | 10/2013 | Bronk | .................. | A01M 29/28 43/123 |
| 2013/0318861 A1 * | 12/2013 | Roeder | ................. | A01M 1/103 43/123 |
| 2015/0216159 A1 * | 8/2015 | Vasudeva | ............. | A01M 1/103 43/123 |
| 2016/0095303 A1 * | 4/2016 | Bronk | .................. | A01M 1/103 43/132.1 |
| 2019/0159440 A1 * | 5/2019 | Zheng | .................. | A01M 1/223 |

(56) References Cited

U.S. PATENT DOCUMENTS

| | | | | |
|---|---|---|---|---|
| 2020/0037780 | A1* | 2/2020 | Schachinger | A01M 1/223 |
| 2020/0296950 | A1* | 9/2020 | Bäckmark | A01M 1/02 |
| 2020/0352152 | A1* | 11/2020 | Stevens | A01M 1/2011 |
| 2021/0315193 | A1* | 10/2021 | Anguillesi | A01M 1/023 |
| 2022/0000092 | A1* | 1/2022 | Aslan | A01M 1/04 |
| 2022/0155482 | A1* | 5/2022 | Woodbury | A01M 1/026 |

FOREIGN PATENT DOCUMENTS

| | | | | |
|---|---|---|---|---|
| JP | 2000000050 A | * | 1/2000 | |
| JP | 2021176644 A | * | 11/2021 | |
| WO | WO-8504782 A1 | * | 11/1985 | |
| WO | WO-9720460 A1 | * | 6/1997 | A01M 1/04 |
| WO | WO-9918780 A1 | * | 4/1999 | A01M 1/026 |
| WO | WO-0069258 A1 | * | 11/2000 | A01M 1/026 |
| WO | WO-2004021780 A1 | * | 3/2004 | A01M 1/223 |
| WO | WO-2011028688 A2 | * | 3/2011 | A01M 1/02 |
| WO | WO-2012064426 A1 | * | 5/2012 | A01M 1/026 |
| WO | WO-2017212112 A1 | * | 12/2017 | A01M 1/02 |

OTHER PUBLICATIONS

Written Opinion of the International Searching Authority for International Patent Application No. PCT/CA2020/050205 Canadian Intellectual Property Office; Gatineau, Quebec, Canada; dated Jul. 24, 2020.

John F. Anderson et al.; "A carbon dioxide, heat and chemical lure trap for the bed bug, Cimex lectularius"; Medical and Veterinary Entomology. 23: 99-105; 2009.

Dae-Yun Kim et al.; "Differences in Climbing Ability of Cimex lectularius and Cimex hemipterus (Hemiptera: Cimicidae)"; Journal of Economic Entomology, pp. vol. 110, Issue 3, Jun. 2017.

Corraine A. McNeill et al.; "Behavioral Responses of Nymph and Adult Cimex lectularius (Hemiptera: Cimicidae) to Colored Harborages"; Journal of Medical Entomology; 2016.

Klaus Reinhardt et al.; "Biology of the Bed Bugs (*Cimicidae*)"; Annu. Rev. Entomol; 2007.

E. Rivnay; Studies in Tropisms and Ecology of the Bed Bug—*Cimex Lectularius L*.); University of Massachusetts Amherst; located at https://core.ac.uk/download/pdf/32438512.pdf; 24:121-36; 1932.

Narinderpal Singh et al.; "Role of Vision and Mechanoreception in Bed Bug, *Cimex lectularius L*. Behavior"; PLoS One; 2015.

* cited by examiner

PROFILE #1

PROFILE #2

PROFILE #3

PROFILE #4

PROFILE #5

PROFILE #6

PROFILE #7

PROFILE #8

PROFILE #9

PROFILE #10

PROFILE #11

PROFILE #12

PROFILE #13

PROFILE #14

PROFILE #20

PROFILE #21

PROFILE #22

PROFILE #23

PROFILE #24

PROFILE #25

PROFILE #26

INSECT TRAPPING DEVICE

CROSS REFERENCE TO RELATED APPLICATIONS

This is a § 371 National Stage Entry application of International Application Serial No. PCT/CA2020/050205, filed Feb. 17, 2020, entitled INSECT TRAPPING DEVICE, which claims the benefit of U.S. Provisional Patent Application Ser. No. 62/809,417, filed Feb. 22, 2019, the disclosures of which are hereby incorporated by reference.

BACKGROUND

The present disclosure relates to the trapping of insects, for example bed bugs.

In the past decade global infestations of bed bugs (*Cimex lectularius*) have risen dramatically. Bed bugs were practically eliminated from Europe and North America. A combination of circumstances has led to bed bugs making a massive resurgence. These circumstances include: increased travel to and from bed bug inhabited areas of the world, the banning of DDT as a pesticide, and reduced awareness and social control of bed bugs. Bed bugs feed exclusively on blood and form dense aggregations around persons' sleeping areas. Their predominant nocturnal behavior and extremely flattened profile of the bed bug allows it to fit into almost any crack or nook, often making them impossible to locate or control.

Prior art approaches have focused primarily on adult bed bugs and their relative size and without consideration of their translucent nature. Bed bugs are flattened, oval and wingless insects and are translucent until they feed on blood and then turn a reddish-brown. Bedbugs have microscopic hairs that give them a banded appearance. Adults grow to 4-5 mm in length and 1.5-3 mm wide. Newly hatched nymphs are translucent, lighter in color and become browner as they molt and reach maturity. Bed bugs (females) deposit three to eight eggs at a time. A total of 300-500 eggs can be produced by a single bug. Their eggs are ⅟₂₅" long and curved. They are often deposited in clusters and attached to cracks, crevices or rough surfaces near adult harborages with a sticky epoxy-like substance. Under optimum conditions and a plentiful supply of blood the bed bugs will accelerate their repopulation and growth cycles. Eggs typically hatch in a week to 12 days. The freshly hatched nymph is beige-colored before feeding, and then turns a reddish color after getting a blood meal. There are 5 nymphal stages of bed bug development to reach maturity, which usually takes about 32-48 days. During this time, the instar must feed on blood in order to continue to its next stage of development. Adult bed bugs can survive for up to seven months without blood and have been known to live in empty buildings for up to one year.

U.S. Pat. No. 1,944,784 discloses a device which requires bugs to climb up along surfaces from a lower electrode to reach an upper electrode (which is spaced at a fixed distance apart), in order to be electrocuted. This configuration does not take in to account the variations in the physical size of bed bugs at various stages of development and their unpredictable point and/or acute or obtuse angle to cross along the leading edge of the lower electrode to reach the upper electrode.

US20130269238A1 utilizes electrified plates mounted horizontally separated by an isolator at a fixed distance, requiring the bugs to crawl along surfaces between the horizontally mounted plates or to climb up a stack of exposed conductor ends in order to be electrocuted. Like U.S. Pat. No. 1,944,784, '238A1 provides a gap between the plates which is the same size along the entire space between the plates and is configured with no relationship to the size of the bed bug.

$CO_2$ is a known as a bed bug host location mechanism/attractant. The behavior of bed bugs to move toward elevated $CO_2$ levels has been previously observed and documented: (Reinhardt and Siva-Jothy, 2007; Anderson et al., 2009; Rivnay, 1932).

US20110113674 discloses a method in which a pest killing material is introduced into an interior compartment of a closed piece of luggage, thereby exterminating pests residing within the interior compartment. Disclosed killing methods/materials include insecticide, heating, cooling, or $CO_2$. Previously identified or suspected contaminated items with bugs in/on objects are within the interior of the case or luggage sealed compartment. Then $CO_2$ is introduced, allowed to displace the oxygen and confined within the sealed compartment until opened. The $CO_2$ is not used as an attractant. The presence of bed bugs and/or eggs on the items is either already known or suspected. No new bugs can enter the sealed compartment while the elevated level of $CO_2$ is maintained.

In approaches, the prior art fails to provide an effective device and method for trapping insects, and killing bed bugs in particular without pesticides.

BRIEF SUMMARY

In an aspect, there is provided an insect trapping device comprising an inner passageway structure defining an inner passageway which, when in an upright orientation, extends from an insect entry zone to an insect delivery zone, the inner passageway structure bordered by at least a pair of opposed insect-facing traction-reducing boundary surface regions to cause an insect to progress toward the insect delivery zone under gravity, with each boundary surface region including at least one of at least a pair of electrode surface regions, wherein each electrode surface region is configured for operative coupling with an electrode power supply to deliver electrical power thereto, the electrode surface regions configured to form an electrocution zone therebetween, with a designated spacing which is configured to initiate electrocution of an instance of the insect descending through the electrocution zone.

In some example embodiments, the designated spacing may be within a size distribution of a designated population of the insect.

Some example embodiments may further comprise the electrode power supply.

In some example embodiments, the electrode power supply may be configured to deliver sufficient power to the electrode surface regions to generate an electrical discharge, according to the designated spacing.

In some example embodiments, the electrical power supply may be configured to generate an electrical potential between the opposed electrode surface regions sufficient to discharge therebetween and through the insect, with or without the insect contacting one or more of the electrode surface regions.

In some example embodiments, the inner passageway structure may further comprise a first electrode structure defining a first electrode surface region and a second electrode structure defining a second electrode surface region.

In some example embodiments, the first and second electrode structures may define continuous or discontinuous instances of the first and second electrode surface regions respectively.

In some example embodiments, boundary surface regions may be nested to form the inner passageway with an annular cross section, at least in part.

In some example embodiments, the inner passageway may define a minimum spacing zone which is included in, adjacent to, or downstream of the electrocution zone, wherein one or more of the boundary surface regions may be configured to progressively reduce a lateral spacing of the annular cross section toward the minimum spacing zone.

In some example embodiments, the boundary surface regions may be formed as inner and outer cones, at least in part.

In some example embodiments, the inner passageway structure may include nested inner and outer body structures, with the first and second electrode surface regions formed respectively thereon.

In some example embodiments, the inner body structure may be removable relative to the outer body structure.

In some example embodiments, the insect entry zone may provide an outer traction-enabling entry surface region configured to provide a travel path for the insect, and a transition region between the outer entry surface region and adjacent a corresponding traction-inhibiting outer boundary surface region.

In some example embodiments, the outer body structure may include a base structure and an annular wall structure extending therefrom to define an annular bottom surface to be in communication with the insect delivery zone.

Some example embodiments may further comprise an inner body support structure centrally located relative to the base structure and extending therefrom. The inner body support structure may be configured to support the inner body structure so as to be substantially aligned with aligned with the annular bottom surface.

In some example embodiments, the inner body structure may include a mounting passage to receive the inner body support structure therein. The inner body structure may be configured to receive the first electrode structure thereon in an aligned position relative to the annular bottom surface according to a central axis of the inner body support structure.

Some example embodiments may further comprise an inner body anchor structure which is configured to be aligned with the inner body structure to receive the first electrode structure therebetween, and removably securable relative to the inner body support structure.

In some example embodiments, the outer annular wall structure may be configured to receive the second electrode structure thereon.

In some example embodiments, the outer annular wall structure and the second electrode structure may be configured to be aligned with the outer annular bottom surface according to the central axis of the inner body support structure.

Some example embodiments may further comprise an outer body anchor structure which is configured to be aligned and securable relative to the outer annular wall structure to receive the second electrode structure therebetween.

Some example embodiments may further comprise a housing having an upper region and a lower region. The lower region may include a skirt structure bordering an access opening, and wherein the outer body anchor structure may define the outer entry surface region adjacent the access opening and opposite the skirt structure.

Some example embodiments may further comprise a plurality of column support structures extending between the outer body anchor structure and the housing and through the insect entry zone.

Some example embodiments may further comprise an insect collection zone in communication with the insect delivery zone.

Some example embodiments may further comprise a heat source positioned adjacent the insect entry zone.

Some example embodiments may further comprise a continuous or intermittent source of $CO_2$ supplied beneath the insect electrocution zone.

Some example embodiments may further comprise a removable and replaceable source of odor beneath and/or adjacent the insect electrocution zone.

Some example embodiments may further comprise a removable and replaceable insect collection pad beneath the insect electrocution zone, within the insect collection zone.

Some example embodiments may further comprise an adhesive, for attachment to a corresponding surface.

Some example embodiments may further comprise an impregnated attractant odor composition.

Some example embodiments may further comprise an impregnated odor scent.

In another aspect, there is provided an insect trapping device comprising an elongate chamber extending from an entry to an exit to form a passageway therebetween, the chamber having one or more peripheral surface regions configured to guide at least one instance of an insect of a population of insects under a force of gravity along the passageway when the chamber is oriented in an upright position, wherein the chamber provides, along the passageway, a pair of electrodes with a progressively reduced spacing therebetween from the entry and selected to place each of the instance of the population between both electrodes, wherein the electrodes are configured to receive power sufficient to electrocute the insects passing therebetween.

In another aspect, there is provided an insect trapping device comprising a chute extending from an entry zone to a delivery zone, the chute having one or more peripheral traction-inhibiting surfaces configured to guide at least one instance of an insect of a population of insects under a force of gravity along the chute when oriented in an upright position, wherein the chute is further configured to deliver the insect to a location to receive an electrocuting quantity of power, and thereafter to deliver the insect to the delivery zone.

In some example embodiments, the traction-inhibiting surfaces may be defined, at least in part, on a pair of electrodes which delivers the electrocuting quantity of power.

In some example embodiments, the traction-inhibiting surfaces may be on opposite sides of the chute, and converge to a minimum spacing to accommodate a lower limit of a size distribution of the population.

In another aspect, there is provided a device for trapping an insect, comprising a chute configured with an inlet to receive an insect, and to deliver the insect under a force of gravity to an outlet, a chamber configured to be in communication therewith below the outlet, at least one $CO_2$ supply port in fluid communication with the chamber to deliver $CO_2$ thereto, wherein the chamber is configured to contain the $CO_2$ therein to asphyxiate an insect in the chamber.

Some example embodiments may further comprise a gas flow controller to establish the CO2 to the chamber at a molecular density sufficient to displace substantially all oxygen therefrom to form a substantially oxygen depleted environment therein.

In some example embodiments, the gas flow controller may be configured to maintain the substantially oxygen depleted environment continuously and/or intermittently.

In some example embodiments, the at least one CO2 supply port may be in fluid communication with a CO2 supply source, and a regulator structure for regulating a volume flow rate of CO2 to be delivered to the chamber.

In some example embodiments, the CO2 gas flow controller may be a fitting to receive a cylinder containing compressed CO2.

In another aspect, there is provided a device for trapping an insect, comprising a housing having upper and lower housing portions, the lower housing portion having an insect-facing inclined surface extending upwardly from an exterior entry region toward an upper insect entry zone, the inclined surface configured to provide a travel path for the insect toward the entry zone, the upper housing portion operatively positioned above the inclined surface to define an opening therebetween to shield the inclined surface, at least in part, and a heat source configured to generate a wavelength recognizable to an insect approaching or traversing the inclined surface toward the entry zone.

In some example embodiments, the heat source may be positioned on the upper housing portion and configured to be above the entry zone, wherein the entry zone may be configured to be in communication with a collection zone.

In some example embodiments, the upper housing portion may be supported by at least one upwardly directed support between the upper and lower housing portions, and the support is configured with at least one insect-facing traction-inhibiting surface to inhibit traverse of the insect along the support.

In some example embodiments, the upper and lower housing portions may be configured so that the inclined surface is planar or conical, at least in part, and/or the entry zone is planar or annular, at least in part.

In another aspect, there is provided an insect trapping device comprising a chute bordered by at least a pair of opposed surface regions, an electrocution zone in communication with the chute to receive insects therefrom under gravity, the chute configured with an opening with sufficient spacing to prevent an instance of an insert of a designated population of insects from traversing from one surface region to another to avoid the chute, the electrocution zone configured with a designated size and electrical power to initiate an electrocuting discharge to an instance of the insect travelling therethrough, and a delivery zone in communication with the electrocution zone to receive the insect following electrocution.

Some example embodiments may further comprise an electrode power supply unit configured to deliver a supply of power to the chute. A detector may be configured to be in communication with the electrode power supply unit to detect a change in an attribute of a supply of power arising from the electrocution of a target insect.

Some example embodiments may further comprise at least one processor in communication with the detector to associate the change with one or more data signatures in memory to identify a target insect.

In some example embodiments, the detector or processor may be configured to output a signal encoding a target insect identity value.

In some example embodiments, the output may be selected from at least one of a display, an input to a computer system, and a signal transmitter.

Some example embodiments of an insect collection pad may further comprise an integrated, affixed and/or mounted circuit chip or other means such as a radio frequency identification (RFID) tag.

In another aspect, there is provided a method of detecting an insect electrocution event, comprising providing an insect trapping device capable of killing an instance of a target of a population of insects by a measurable power signal; detecting a change in an attribute of power signal arising from the electrocution event of the target insect, and associating the change with one or more stored values of data representing the attribute to identify the target insect.

In some example embodiments, the attribute may be selected from at least one of a change in voltage, current, and a duration associated with the change.

In another aspect, there is provided a non-transitory computer readable medium having recorded thereon statements and instructions for execution by a processor on a remote device, said statements and instructions comprising:
 a) configuring an instructional input on the remote device to generate following user interaction therewith corresponding to one or more instructions for configuring an insect trapping device;
 b) receiving from the insect trapping device, one or more signals encoding a target insect identity; and
 c) storing the target insect identity in memory.

In another aspect, there is provided a non-transitory computer readable medium having recorded thereon statements and instructions for execution by a processor on a smart phone, said statements and instructions comprising:
 a) configuring a touch screen on the smart phone to generate touch screen data following user interaction with the touch screen corresponding to one or more instructions for configuring the device of any preceding aspect or exemplary embodiment;
 b) receiving from the insect trapping device, one or more signals encoding a target insect identity; and
 c) storing the target insect identity in memory.

In another aspect, there is provided an insect trapping device comprising confined passageway means which, when in an upright orientation, extends from an insect entry zone to an insect delivery zone, the confined passageway means bordered by at least one electrode means to form an electrocution zone therein, the at least one electrode means configured for operative coupling with power supply means to deliver electrical power thereto, wherein the confined passageway means and the least one electrode means cooperate in the electrocution zone to initiate electrocution of an instance of the insect descending therethrough.

In some example embodiments, the confined passageway means has a designated spacing according to a size distribution of a designated population of the insect.

Some example embodiments further comprise the power supply means.

In some example embodiments, the power supply means is configured to deliver sufficient power to the electrode means to generate an electrical discharge, according to the designated spacing.

In some example embodiments, the at least one electrode means includes a plurality of opposed electrode means.

In some example embodiments, the power supply means is configured to generate an electrical potential between the opposed electrode means sufficient to discharge therebetween and through the insect, with or without the insect contacting one or more of the electrode means.

In some example embodiments, the opposed electrode means are nested to form the confined passageway means with an annular cross section, at least in part.

In some example embodiments, the confined passageway defines a minimum spacing, wherein the opposed electrode means are configured to progressively reduce a lateral spacing of the annular cross section toward the minimum spacing.

In some example embodiments, the opposed electrode means are formed as inner and outer cones, at least in part.

In some example embodiments, an inner of the nested electrode means is removable relative to an outer of the electrode means.

In another aspect, there is provided an insect trapping device comprising an elongate chamber means extending from an entry to an exit to form a passageway means therebetween, the chamber means having one or more peripheral surface regions configured to guide at least one instance of an insect of a population of insects under a force of gravity along the passageway means when the chamber means is oriented in an upright position, wherein the chamber means provides, along the passageway means, at least a pair of spaced electrode means with a progressively reduced spacing therebetween, wherein the electrode means are configured to receive power sufficient to electrocute the insects passing therebetween.

In another aspect, there is provided an insect trapping device comprising chute means extending from an entry zone to a delivery zone, the chute means configured to guide at least one instance of an insect of a population of insects under a force of gravity along the chute means when oriented in an upright position, wherein the chute means is further configured to deliver the insect to a location to receive an electrocuting quantity of power, and thereafter to deliver the insect to the delivery zone.

In another aspect, there is provided a device for trapping an insect, comprising chute means configured with an inlet to receive an insect, and to deliver the insect under a force of gravity to an outlet, chamber means configured to be in communication with the chute means at the outlet thereof, at least one CO2 supply means in fluid communication with the chamber means to deliver CO2 thereto, wherein the chamber means is configured to contain the CO2 therein to asphyxiate an insect therein.

Some example embodiments further comprise a gas flow control means to establish the CO2 in the chamber means at a molecular density sufficient to displace substantially all oxygen therefrom to form a substantially oxygen depleted environment therein.

In some example embodiments, the gas flow control means is configured to maintain the substantially oxygen depleted environment continuously and/or intermittently.

In some example embodiments, the at least one CO2 supply means is in fluid communication with a CO2 supply source, and a regulator means for regulating a volume flow rate of CO2 to be delivered to the chamber means.

BRIEF DESCRIPTION OF THE SEVERAL VIEWS OF THE DRAWINGS

Several example embodiments of the present disclosure will be provided, by way of examples only, with reference to the appended drawings, wherein.

DETAILED DESCRIPTION

Figure 1:
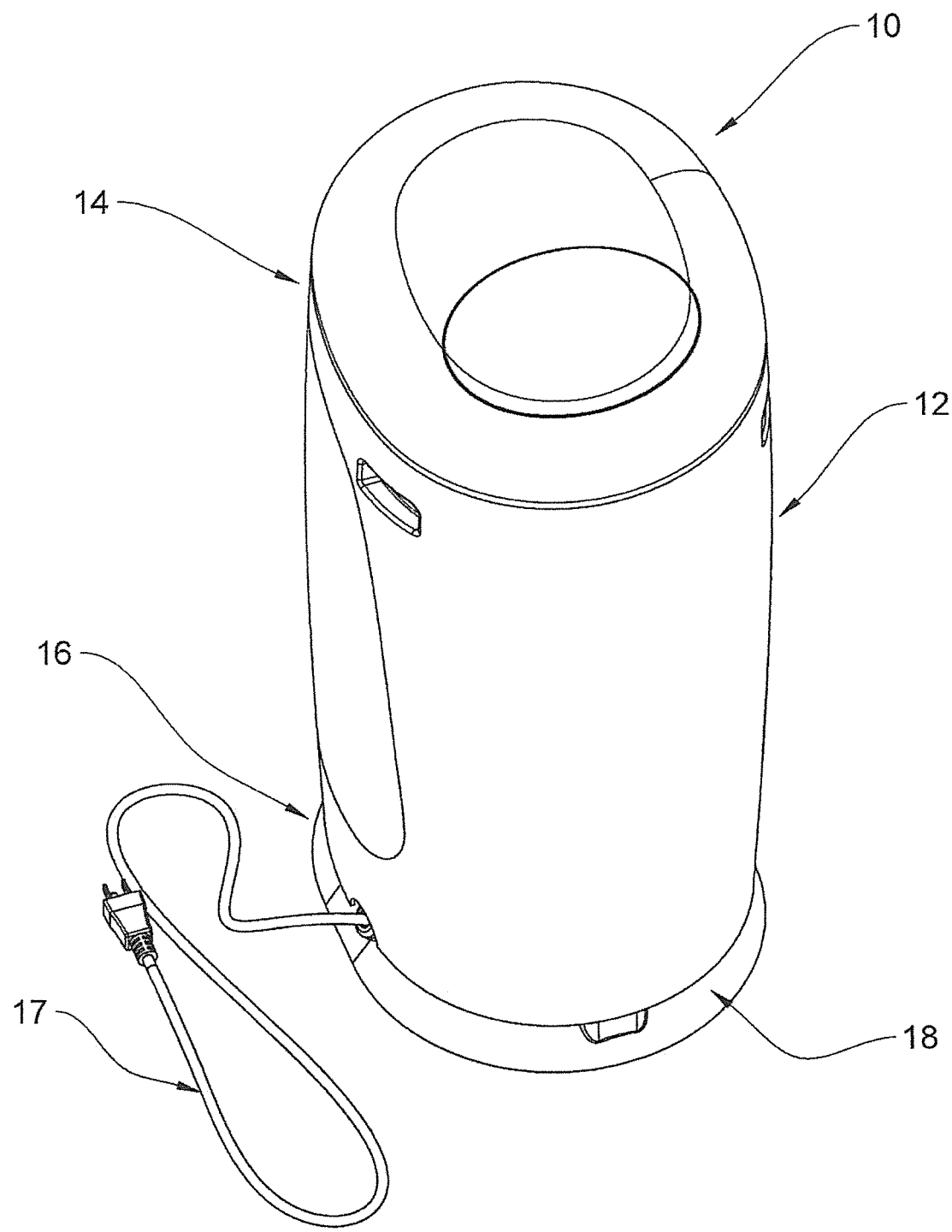
FIG. 1 is a perspective view of an insect trapping device.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure. Furthermore, any one element, feature, structure, function, of any aspect and/or example embodiment described in the present disclosure including the figures, clauses and/or claims herein, may itself be claimed on its own or be combined with any one or more elements, features, structures, functions, and/or steps from the same or any other aspects and/or example embodiments described in the present disclosure including the figures, clauses and/and claims herein.

The present disclosure describes what are considered to be practical example embodiments. It is recognized, however, that departures may be made within the scope of the invention according to a person skilled in the art. Further, the subject matter of the present disclosure supports and provides sufficient basis for any element, feature, structure, function, and/or step of any aspect, and/or example embodiment described in the present disclosure including the figures, clauses and/or claims herein to be claimed alone in an independent claim and be fully supported herein, or be combined with any other one or more elements, features, structures, functions, and/or steps of any aspect and/or example embodiment described in the present disclosure including the figures, clauses and/or claims herein, as basis for an independent or dependent claim herein. With respect to the above description, it is to be realized that the dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The term "traction-enabling" in reference to a surface in the present disclosure may include, but is not limited to, a characteristic of the surface which enables an instance of an insect, of a designated population thereof, to traverse the surface when the surface is inclined or upright. This characteristic may be expressed in terms of a frictional coefficient or a degree to which a surface may be patterned with protrusions and/or recesses which provide the insect with a foot hold on the surface. For instance, a surface on glass, or stainless steel sanded to a grit of about 1,200 or lower and polished may be considered to be traction-enabling for some insects, such as bed bugs, but may not be for others. By extension, then, the term "traction-reducing" or "traction-inhibiting" in reference to a surface in the present disclosure may include, but is not limited to, a characteristic of the surface which reduces or disables an instance of an insect, of a designated population thereof, to traverse the surface when the surface is inclined or upright. For instance, a surface on glass or stainless steel sanded to a grit of higher than about 2,500 polished and buffed may be considered to be traction-inhibiting for bed bugs in an upright configuration. As the grit value increases, so may the traction-inhibiting characteristic of the surface to apply to surfaces which may inclined, but not necessarily vertical.

Referring to the FIG. 1, there is provided an insect trapping device 10, contained within a housing 12 defining an upper housing region 14 and a lower housing region 16. In this example embodiment, the upper and lower housing regions 14, 16 border a circumferential access opening 18 which provides access of insects to the device 10.

Figure 4:
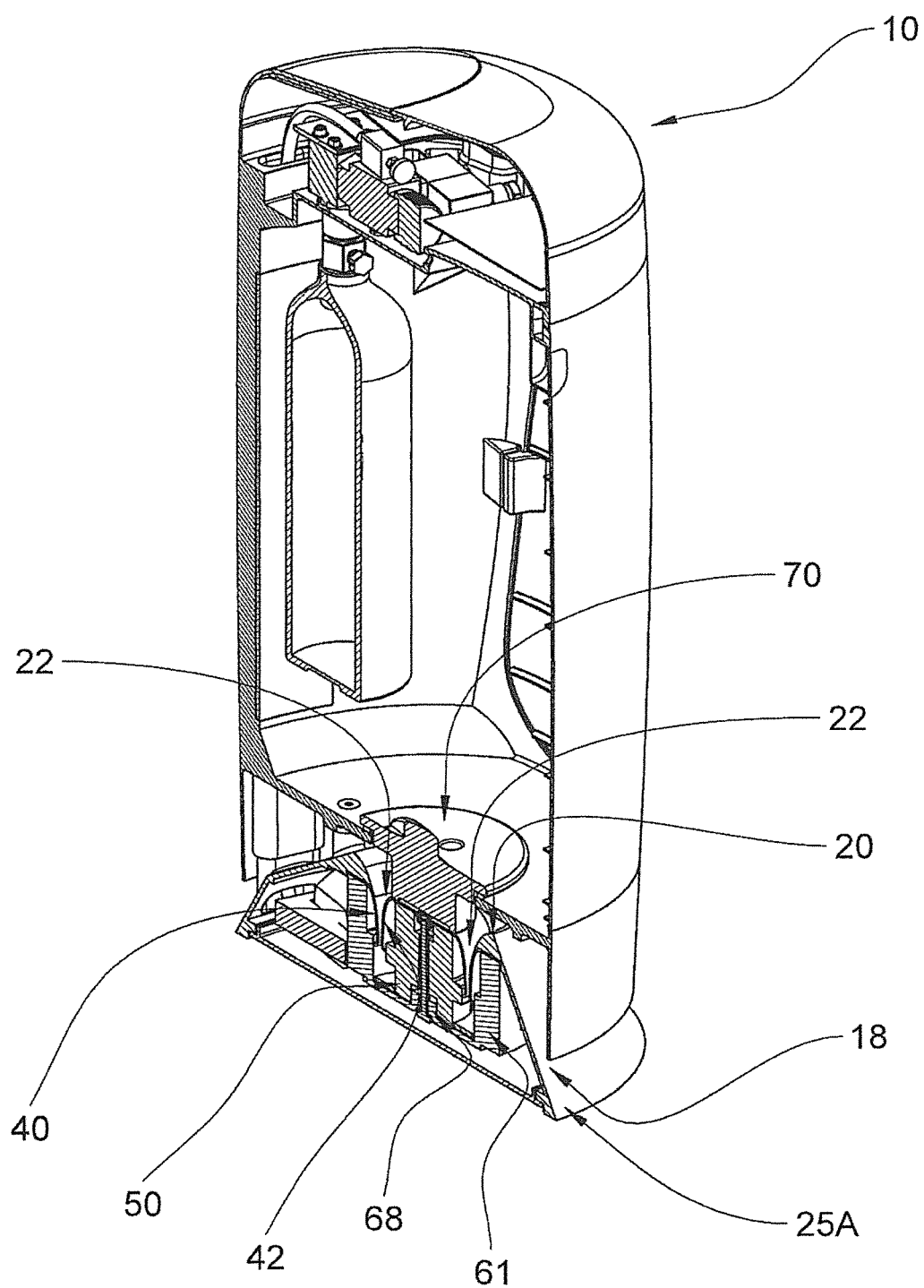
FIG. 4 is a perspective longitudinal sectional view taken along line 4-4 of the device of FIG. 3A) top view.
Figure 6:
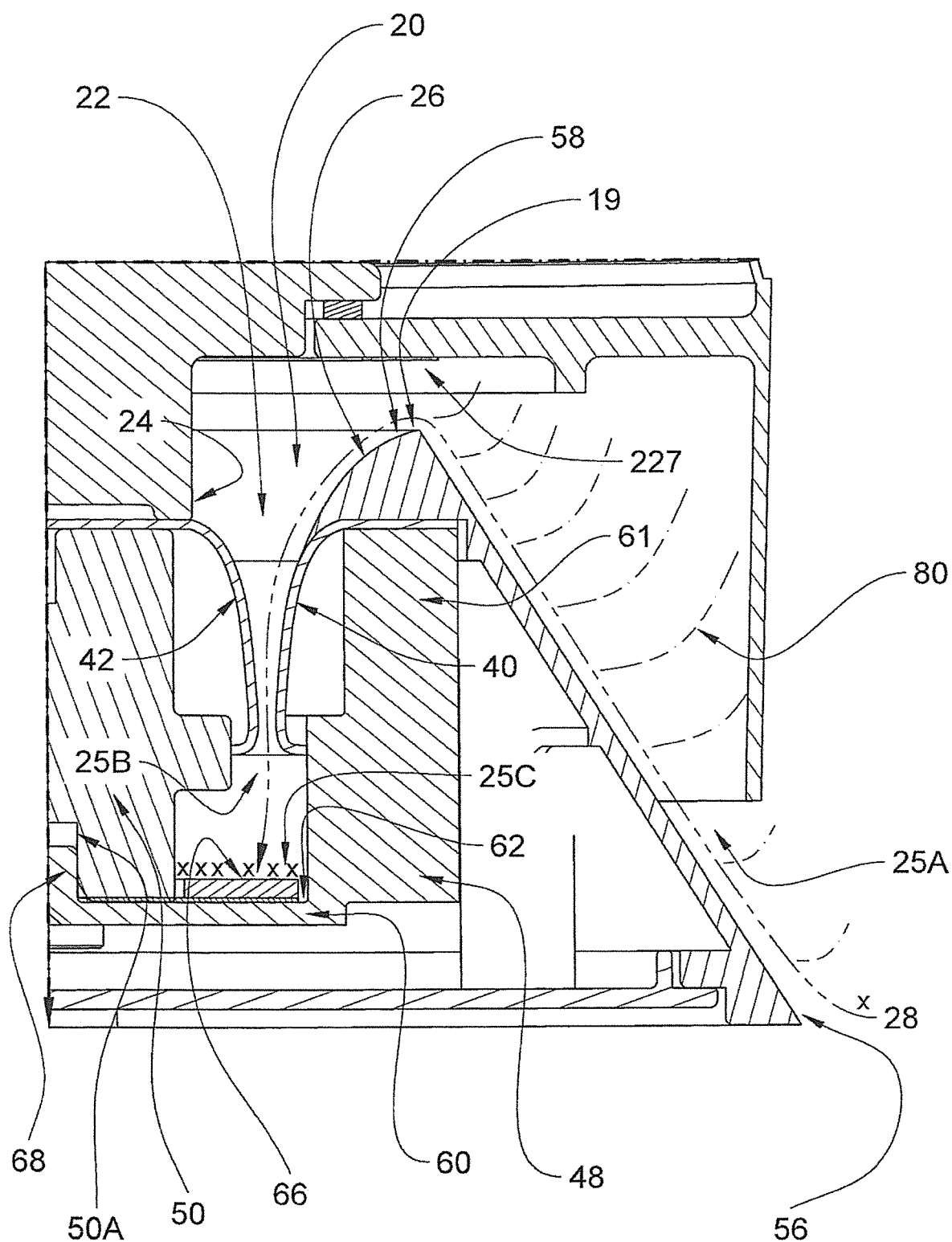
FIG. 6 is a sectional view taken on the dashed oval shown in FIG. 5.

FIGS. 4 and 6 show cross sectional views of the device 10 in which the circumferential access opening 18 provides an insect entry zone 25a which leads to an insect entry summit region 19 which provides a transition region 58 to an inner passageway structure 20 defining an inner passageway 22.

Figure 7:
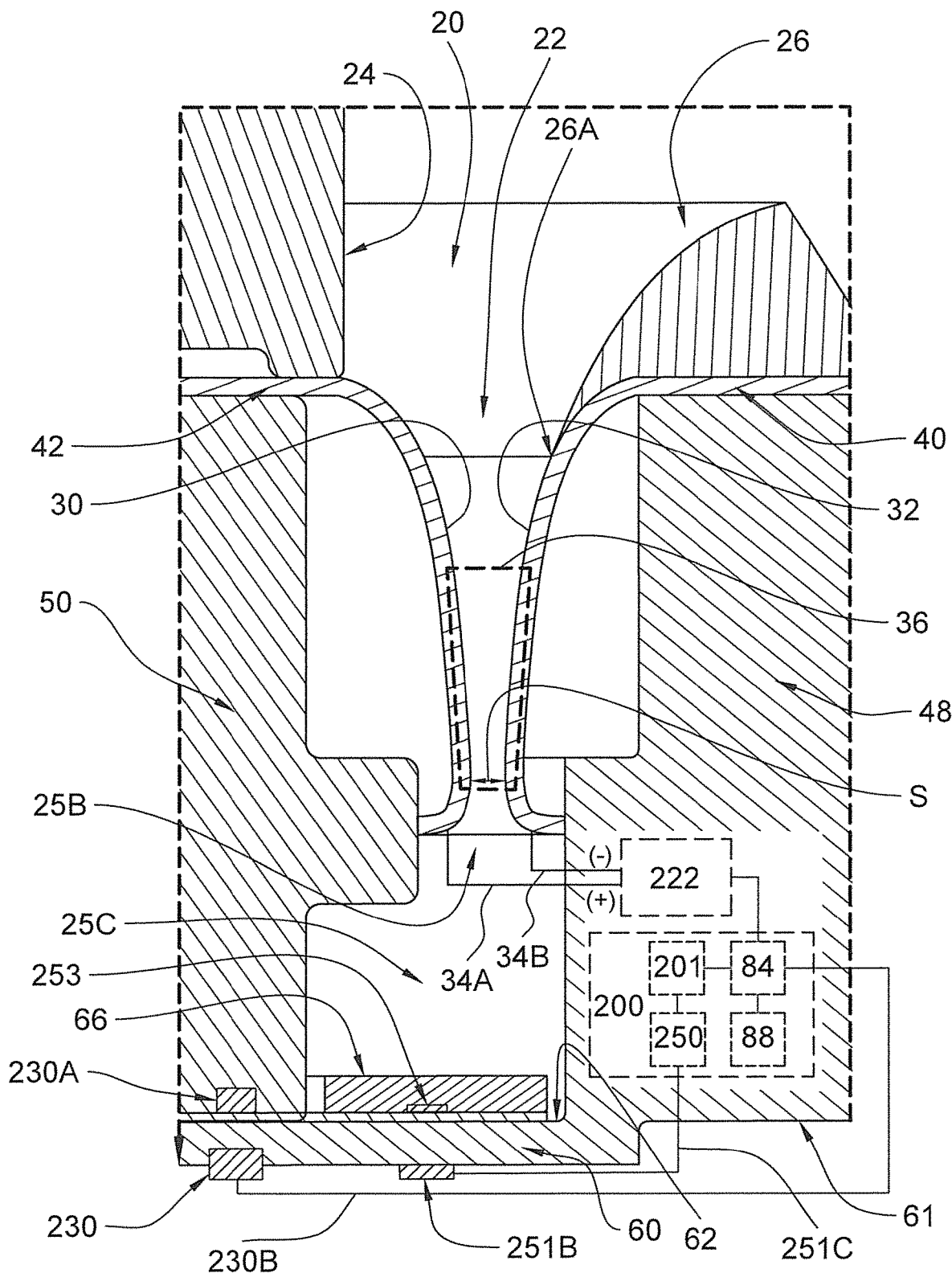
FIG. 7 is a further magnified fragmentary sectional view taken on the dashed oval shown in FIG. 5.

Referring to FIGS. 6 and 7, the inner passageway structure 20 is bordered by a pair of opposed insect-facing traction-reducing boundary surface regions 24, 26 to cause an insect represented by "x"'s to progress toward an insect delivery zone 25b under gravity after passing the insect entry summit region 19 along an insect path shown at 28, which begins at the access opening 18. Each boundary surface region 24, 26 includes at least one of at least a pair of elongate electrode surface regions 30, 32.

Each electrode surface region may be configured for operative coupling with an electrode power supply 222 to deliver electrical power thereto. The electrode surface regions 30, 32 form an electrocution zone generally shown at 36 with a designated spacing between the respective electrode surface regions 30, 32 which may be configured with reference to a size distribution of a designated population of insects. In this manner, an insect of the population traveling under gravity along the passageway 22 initiates electrocution of the insect by the opposed electrode surface regions 30, 32 in the electrocution zone 36.

Referring to FIG. 7, the electrode power supply shown schematically at 222 may be configured to deliver sufficient power to the electrode surface regions 30, 32 to generate the electrical discharge, according to the designated minimum spacing zone "S" between them. The electrical potential between the opposing electrode surfaces is sufficient to discharge between the electrode surface regions 30, 32 by an insect traveling between them, with or without the insect having to touch either or both electrode surface regions 30, 32. The electrode power supply 222 may also be seen in FIG. 8, in which the positive and negative leads 34a, 34b are secured to electrical fasteners 70b and 70c as are described below.

Figure 5:
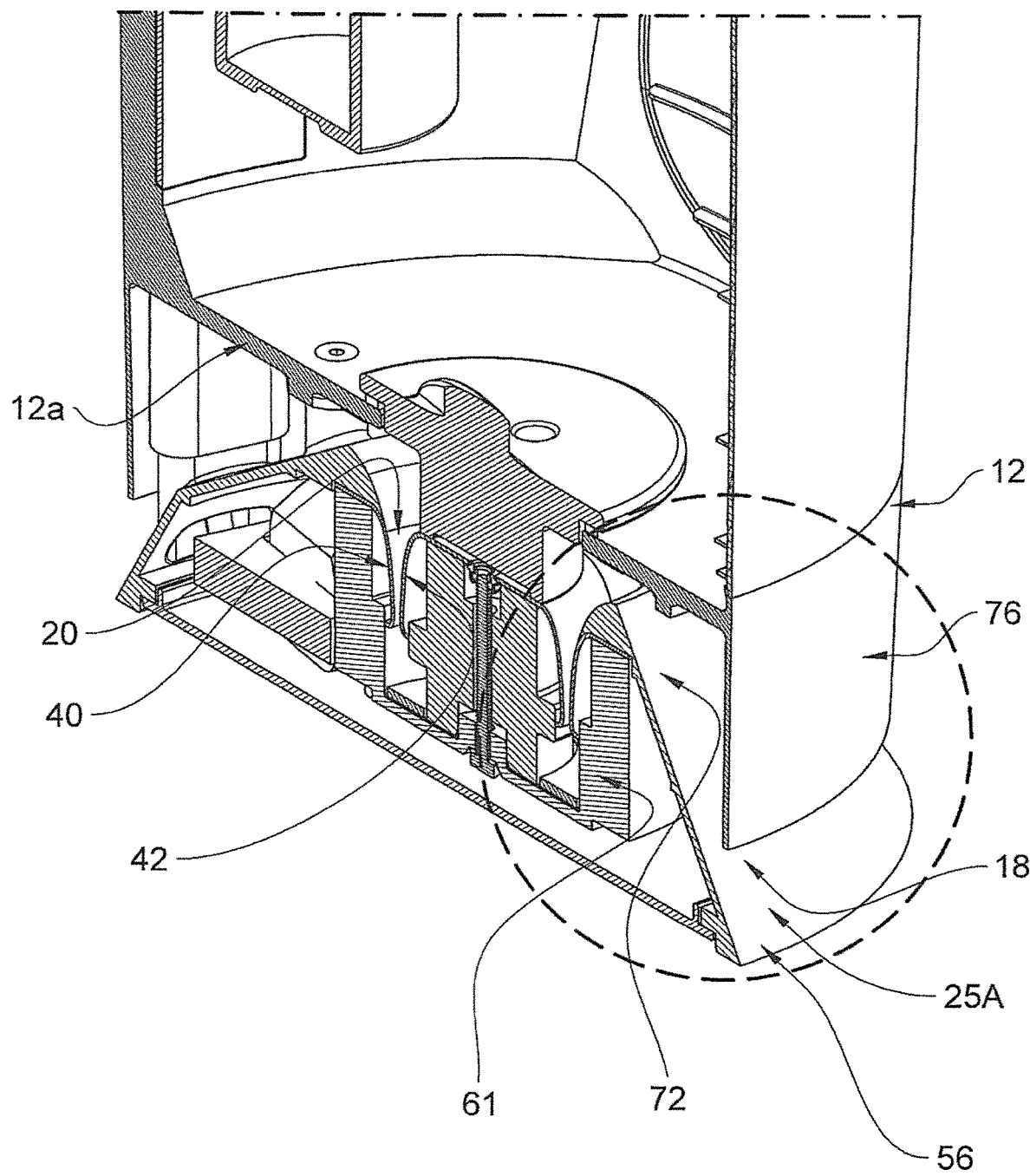
FIG. 5 is a magnified perspective longitudinal sectional view of a lower portion of the device as viewed in FIG. 4.

Referring to FIGS. 5 and 7, the inner passageway structure 20 may further comprise an outer electrode structure 40 defining the outer electrode surface region 32 and an inner electrode structure 42 defining the inner electrode surface region 30. The outer and inner electrode structures 40, 42 may, in this case, be toroidal in shape, at least in part, to define continuous or discontinuous instances of the outer and inner electrode surface regions 40, 42 respectively. Other example embodiments may provide the outer and inner electrode structures in other non-toroidal configurations.

Referring to FIGS. 5, 6 and 7, the inner boundary surface region 24 may be configured to be nested within the outer boundary surface region 26 to form the inner passageway structure 20 with an annular cross section. The inner passageway 22 defines a minimum spacing zone "S" which is included in, adjacent to, or downstream of the electrocution zone 36, wherein one or more of the outer and inner boundary surface regions 26, 24 may be configured to progressively reduce the annular cross section of the passageway toward the minimum spacing zone "S". As shown, one or each of the outer and inner boundary surface regions 26, 24 may present cone shaped profiles, at least in part in cross section as shown. Further, the inner passageway structure 20 may include nested outer and inner body structures 48, 50, which support the outer and inner electrode structures 40, 42 respectively. In this example embodiment, the inner body structure 50 is also removable from the outer body structure 48 for cleaning, access to the insect collection pad (as will be described) and the like.

Referring to FIG. 6, in some example embodiments, the insect entry zone 25a may provide an outer insect-facing traction-enabling outer entry surface region 56 configured to provide the insect path 28 to the insect entry summit region 19, which provides a transition region 58 between the traction-enabling outer entry surface region 56 and the traction-inhibiting outer boundary surface region 26. In this case, the entry surface region 56 extends from the access opening 18 and both extend the entire periphery of the device 10. Thus, the access opening 18 and access surface region may be configured to enable one or more insects to enter the device 10 from any point along the periphery. In other example embodiments, the access opening and/or the entry surface region 56 may not extend the entire periphery.

In some example embodiments, a traction-enabling and traction-inhibiting friction coefficient of the surfaces may provide a notable performance improvement. The most notable observed difference in traction is the stage of development of the bed bug and its ability to utilize their hook-like tarsal claws. At a micron level, both the development of the claw tip and the distance between the tips appears to provide the variations in performance observed during experiments.

As reported in the reference below, researchers have found that the sex of the bed bug and its strain within the *Cimex lectularius* classification also have been found to play a role. The tropical bed bug, *Cimex hemipterus*, can readily climb out of smooth-walled pitfall traps that the common North American *Cimex lectularius* could not. That the tibial pad of adult *C. hemipterus* had a greater number of hairs than on that of *C. lectularius*, is thought to be part of the reason for the difference in ability (Dae-Yun Kim, J. B.-Y. (2017, 03 15). Differences in Climbing Ability of *Cimex lectularius* and *Cimex hemipterus* (Hemiptera: Cimicidae). Journal of Economic Entomology, pp. Volume 110, Issue 3, June 2017, Pages 1179-1186).

In some example embodiments, as shown in FIG. 7, the outer boundary surface region 26 has a substantially continuous profile at its lower terminus 26a, so as to provide a substantially continuous surface profile for the descending insect. However, in other configurations the inner boundary surface region 24 may be provided at or adjacent the location of the terminus 26a.

Referring to FIG. 6, the device 10 further comprises an insect collection zone 25c in communication with the insect delivery zone 25b.

Referring to FIGS. 6 and 7 the outer body structure 48 provides an outer base structure 60, with an outer annular wall structure 61 extending upwardly therefrom (as viewed in FIG. 6), and with the inner body structure 50 removably anchored thereto. The outer base structure 60 provides an outer annular bottom surface 62 below the insect delivery zone 25b and in line with the insect path 28 to receive insects therefrom represented by "x"'s. Also provided is a removable and replaceable insect collection pad 66 positioned inside the outer body structure on the outer annular bottom surface 62 beneath the insect electrocution zone 36, within the insect collection zone 25c. In this case, the insect collection pad 66 may include an insect-facing adhesive layer to trap the insect represented by the pattern of "x"'s, as well as an adhesive layer on pad substrate for securing and alignment of the insect collection pad 66, if desired, to the base of the inner body structure 50, to assist in the extraction or insertion of the insect collection pad 66 when servicing. Further, the insect collection pad 66 may be provided with one or more identification features such as an RFID chip or the like for the purpose of insect monitoring and/or detection. While the insect collection zone 25c is directly below the electrocution zone 36, other configurations may be provided in which other surfaces or zones may be between the insect collection zone 25c and the electrocution zone 36.

In some example embodiments, the insect collection pad may also incorporate sound absorption and deflection qualities through the use of composite materials and surface textures.

As reported in the reference below, when mounted in the installed position within the device, visually exposed surfaces may utilize a white or off-white color to provide a contrast color for body part identification and/or a red color as a known attractant color (*Narinderpal Singh*, Mar. 6, 2015 Role of Vision and Mechanoreception in Bed Bug, *Cimex lectularius* L. Behavior PLoS One. 2015; 10(3): eO 1 18855.) (McNeill C A, Pereira R M, Koehler P G, McNeill S A, Baldwin R W. Behavioral Responses of Nymph and Adult *Cimex lectularius* (Hemiptera: Cimicidae) to Colored Harborages. Journal of Medical Entomology. 2016).

Referring to FIGS. 4 and 6, in some example embodiments, an inner body support structure 68 is centrally located on the outer base structure 60 and extends outwardly therefrom. The inner body support structure 68 may be configured to support the inner body structure 50 so as to be aligned with the outer annular bottom surface 62. Alignment of the inner body structure 50 with the outer annular bottom surface 62 may, in other cases, not necessarily be aligned, such as may be the case where the configuration of the inner passageway is curvilinear or linear, but not necessarily annular.

Figure 17:
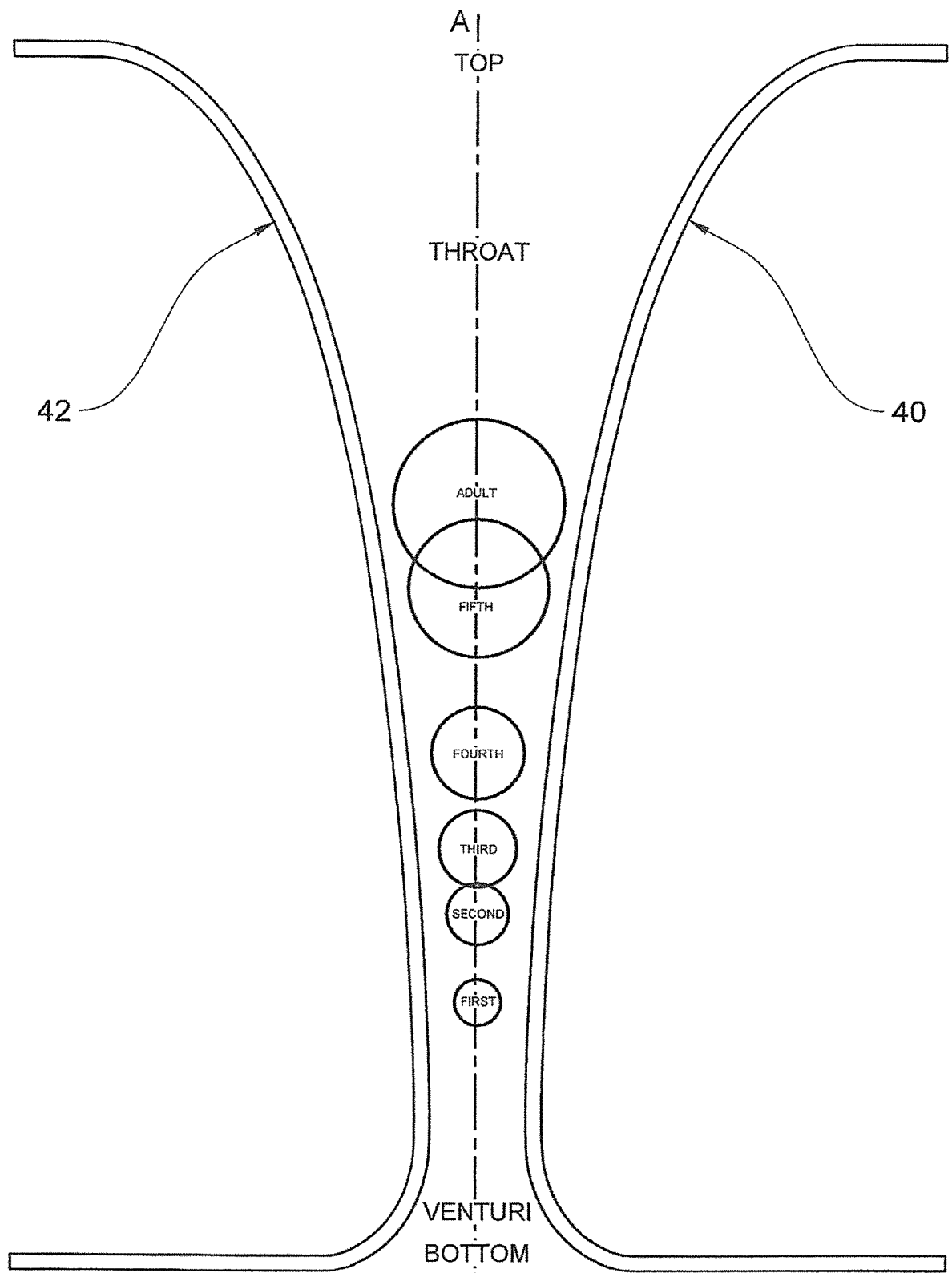
FIG. 17 is a schematic sectional view of the outer and inner electrode structures of the device of FIG. 1.

FIG. 17 shows a magnified fragmentary view of the outer and inner electrode structures 40, 42 according to FIG. 7, which can be seen to form a venturi shaped inner passageway 22, with different sized insects represented by circles, with the uppermost circle labelled adult and the remaining circles representing nymphal stages of growth or age, or variants or types of the insect population being targeted for use, for example a bed bug whose dimensions may range from about 1.5 to 5.5 mm in diameter as shown.

Figure 18:
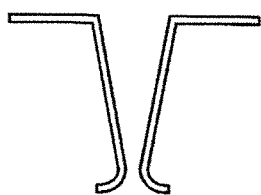
FIGS. 18 to 20 are schematic sectional views of alternative configurations of outer an inner electrode structures of the device of FIG. 1.
Figure 18:
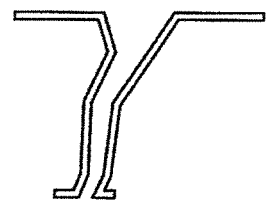
Figure 18:
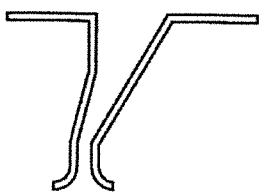
Figure 18:
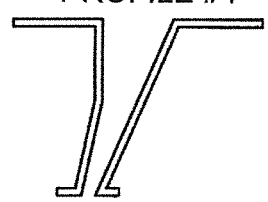
Figure 18:
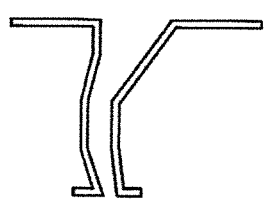
Figure 18:
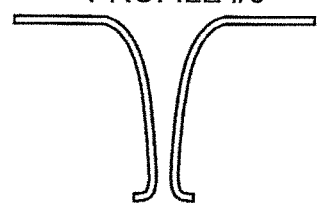
Figure 18:
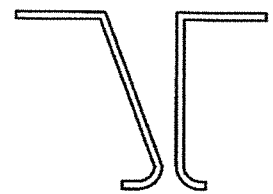
Figure 18:
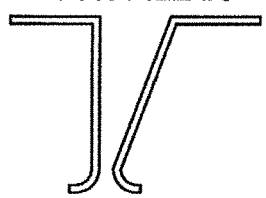
Figure 19:
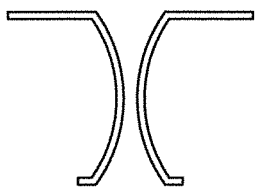
Figure 19:
Figure 19:
Figure 19:
Figure 19:
Figure 19:
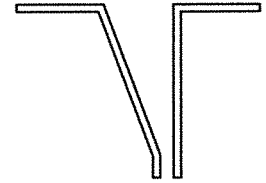
Figure 20:
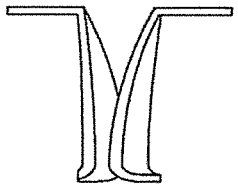
Figure 20:
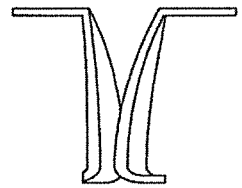
Figure 20:
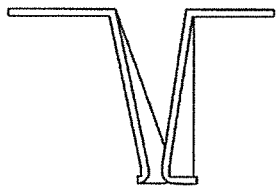
Figure 20:
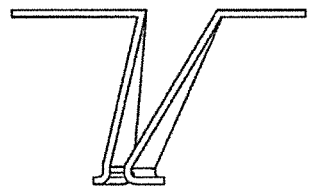
Figure 20:
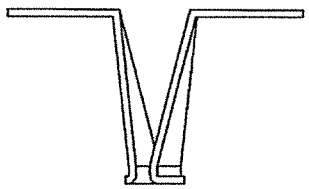
Figure 20:
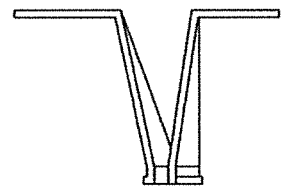
Figure 20:
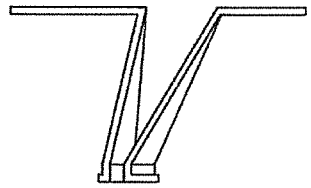
Figure 21:
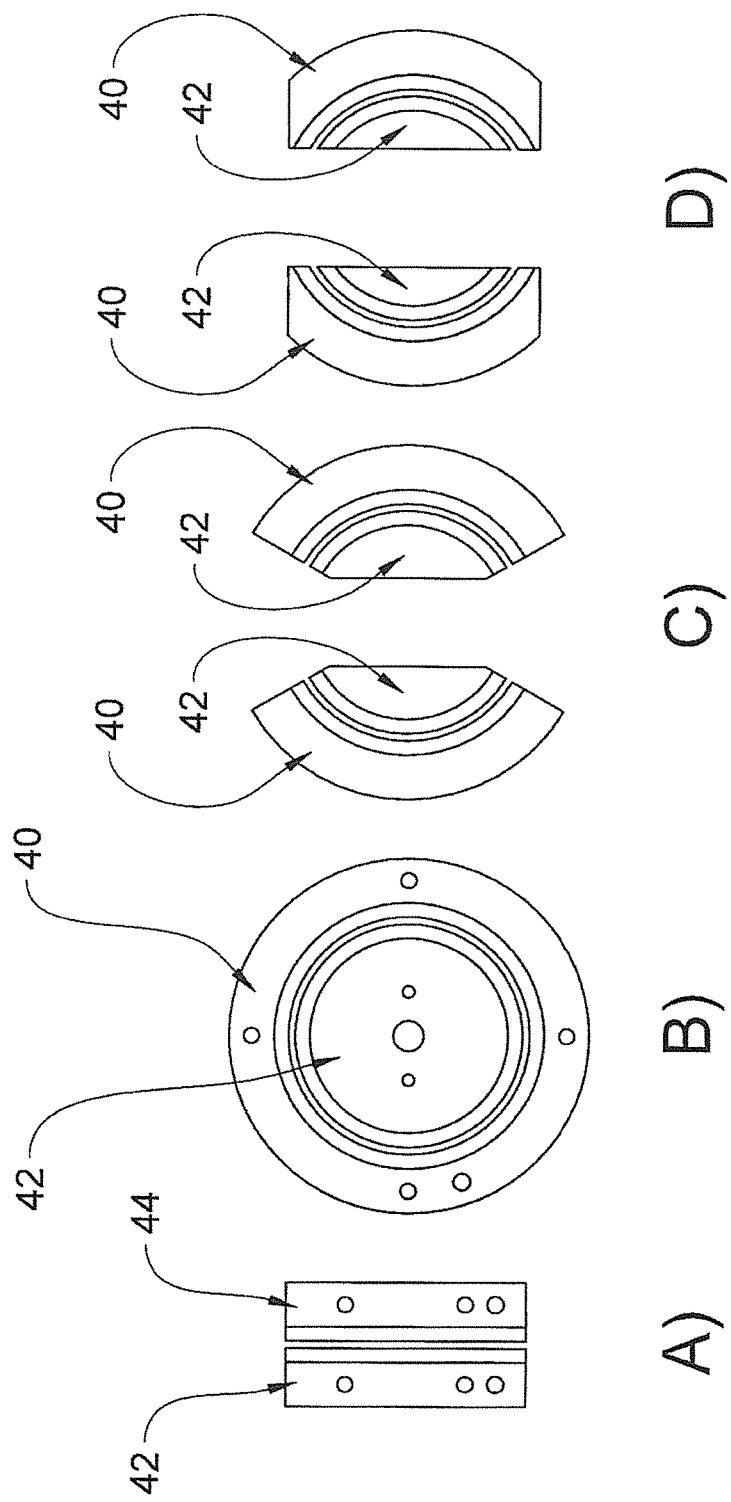
FIGS. 21 and 22 are schematic plan views of alternative configurations of outer and inner electrode structures of the device of FIG. 1.
Figure 22:
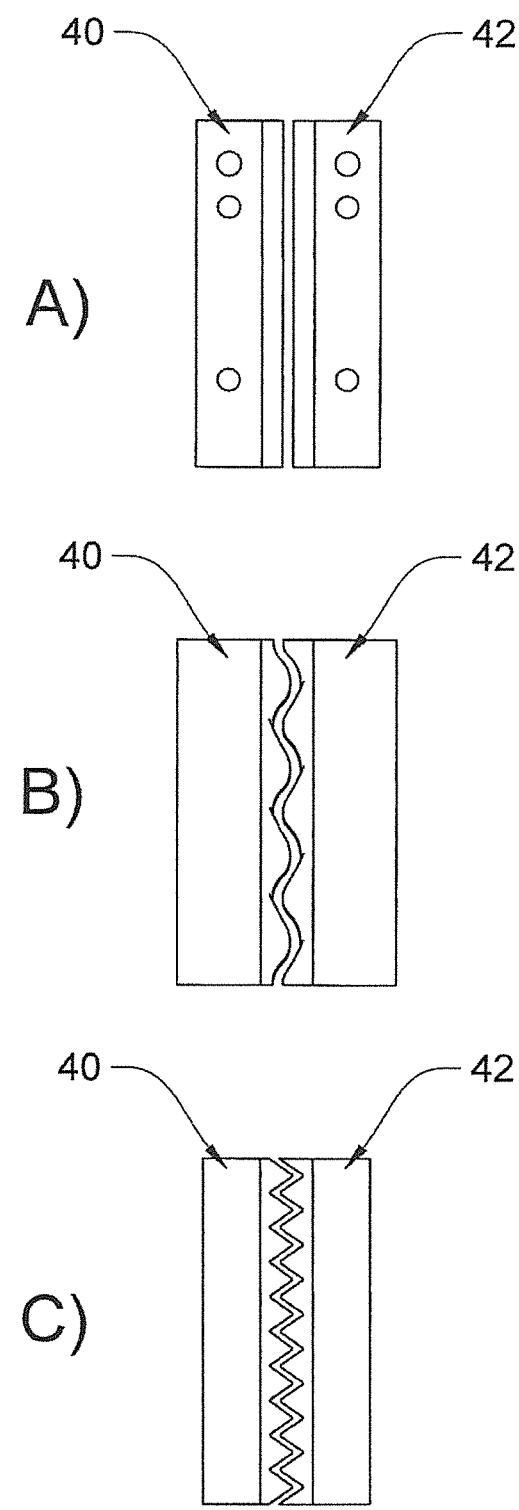

FIGS. 18, to 20 show alternative sectional configurations to the configuration shown in FIG. 17, while FIGS. 21 and 22 show alternative vertical plan views taken on center axis "A" of FIG. 17. It can be seen that FIGS. 21A), 22A), 22B) and 22C) provide linear outer and inner electrode structures 40, 42, while FIGS. 21B), 21C) and 21D) provide annular or part annular outer and inner electrode structures 40, 42.

Referring to FIG. 6, the inner body structure 50 includes a mounting passage 50a to receive the inner body support structure 68 therein, while the inner body structure 50 is configured to receive the inner electrode structure 42 thereon in an aligned position relative to a central axis A of the inner body support structure 68 and to the outer annular bottom surface 62.

Figure 9:
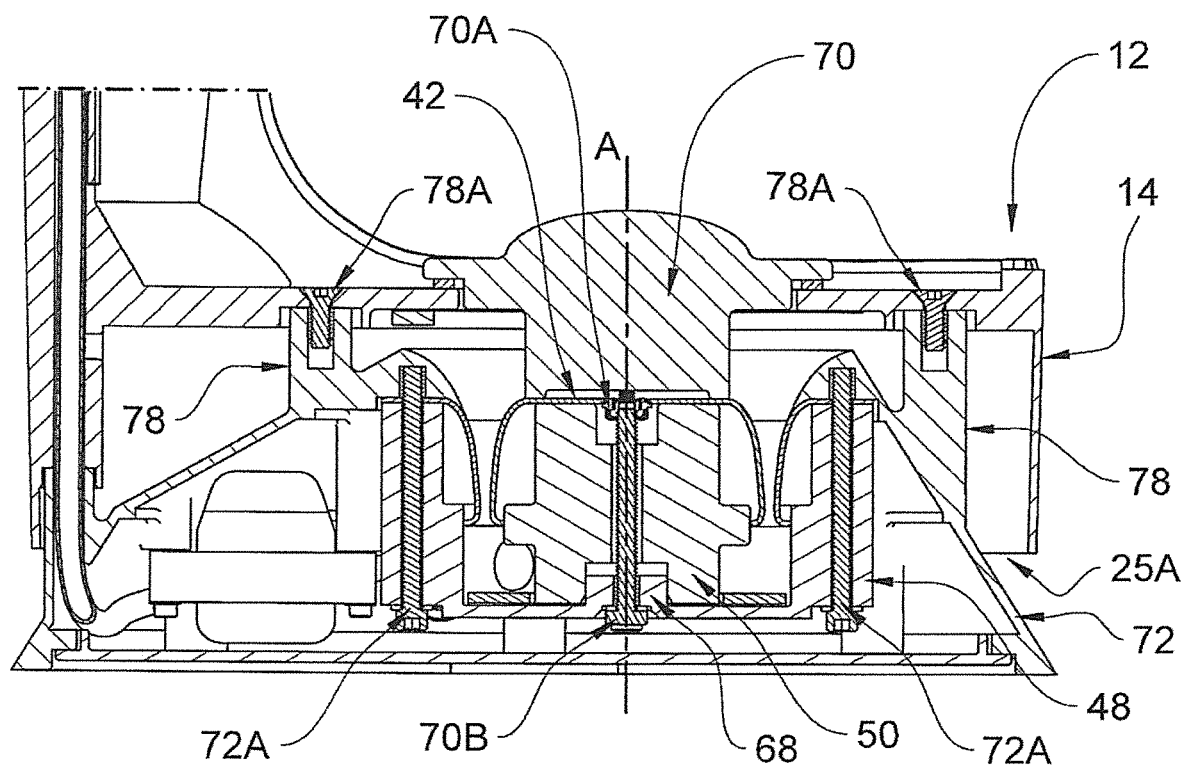
FIG. 9 is a perspective longitudinal sectional view of the lower portion taken along line 9-9 of the device as viewed in FIG. 3C plan view through the column support structures 78.
Figure 10:
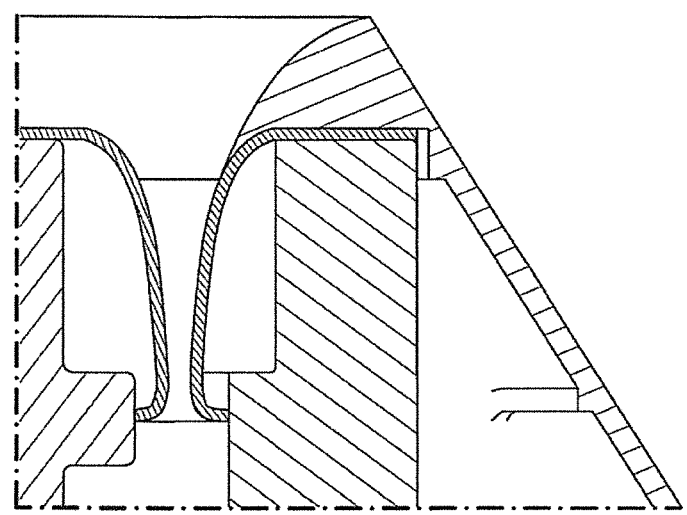
FIG. 10 is another sectional view according to FIG. 6.

Referring to FIG. 9, the inner body anchor structure 70 is aligned with the central axis "A", with the inner body structure 50 and with the inner electrode structure 42 sandwiched therebetween, and removably securable to the inner body support structure 68. In this example embodiment, the inner body anchor structure includes a nut 70a which receives fastener 70B.

Referring to FIGS. 6 and 9, the annular wall of the outer body structure 48 may be further configured to receive the outer electrode structure 40 thereon in an aligned position relative to the vertical center axis "A" of the inner body support structure 68 and to the outer annular bottom surface 62.

Figure 8:
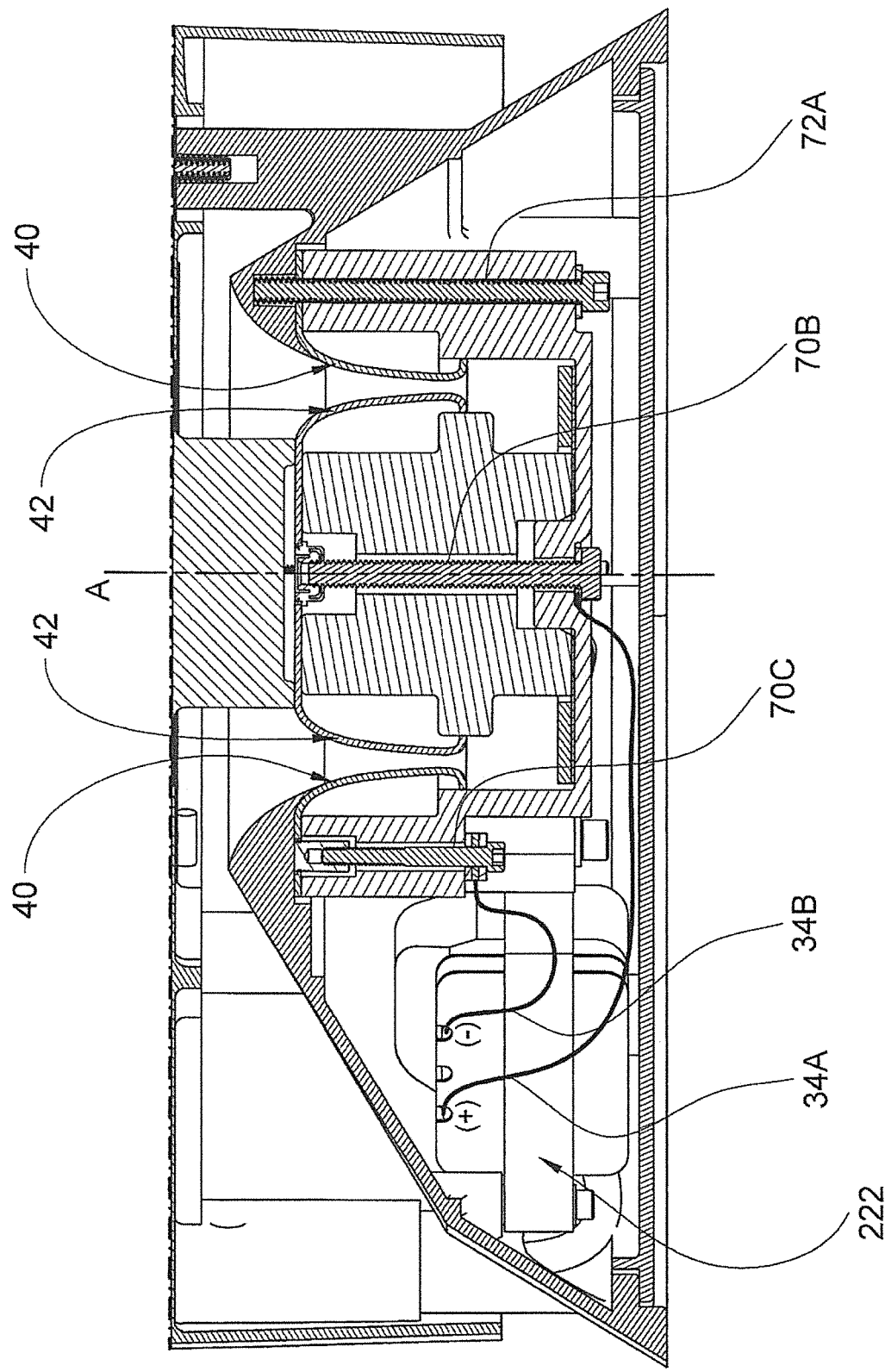
FIG. 8 is a perspective longitudinal sectional view of the lower portion taken along line 8-8 of the device as viewed in FIG. 3B) top view.

Referring to FIG. 8, the electrically conductive fastener 70B may be operable to deliver power to the inner electrode structure 42 by way of the lead 34a anchored thereto as shown in FIG. 8.

Referring to FIGS. 5, 6 and 9, an outer body anchor structure 72 may be aligned with and secured to outer body structure 48 by way of fasteners 72A to hold the outer electrode structure 40 in position relative to the central axis "A" and to the outer annular bottom surface 62. In this case, the outer body anchor structure 72 defines the outer entry surface region 56.

Referring to FIG. 8 the electrically conductive fastener 70C may be operable to deliver power to the outer electrode structure 40 by way of the lead 34b anchored thereto as shown in FIG. 8.

Referring to FIG. 5, the housing 12 includes a housing skirt structure 76 bordering the access opening 18 and is supported by the outer body anchor structure 72.

Figure 16:
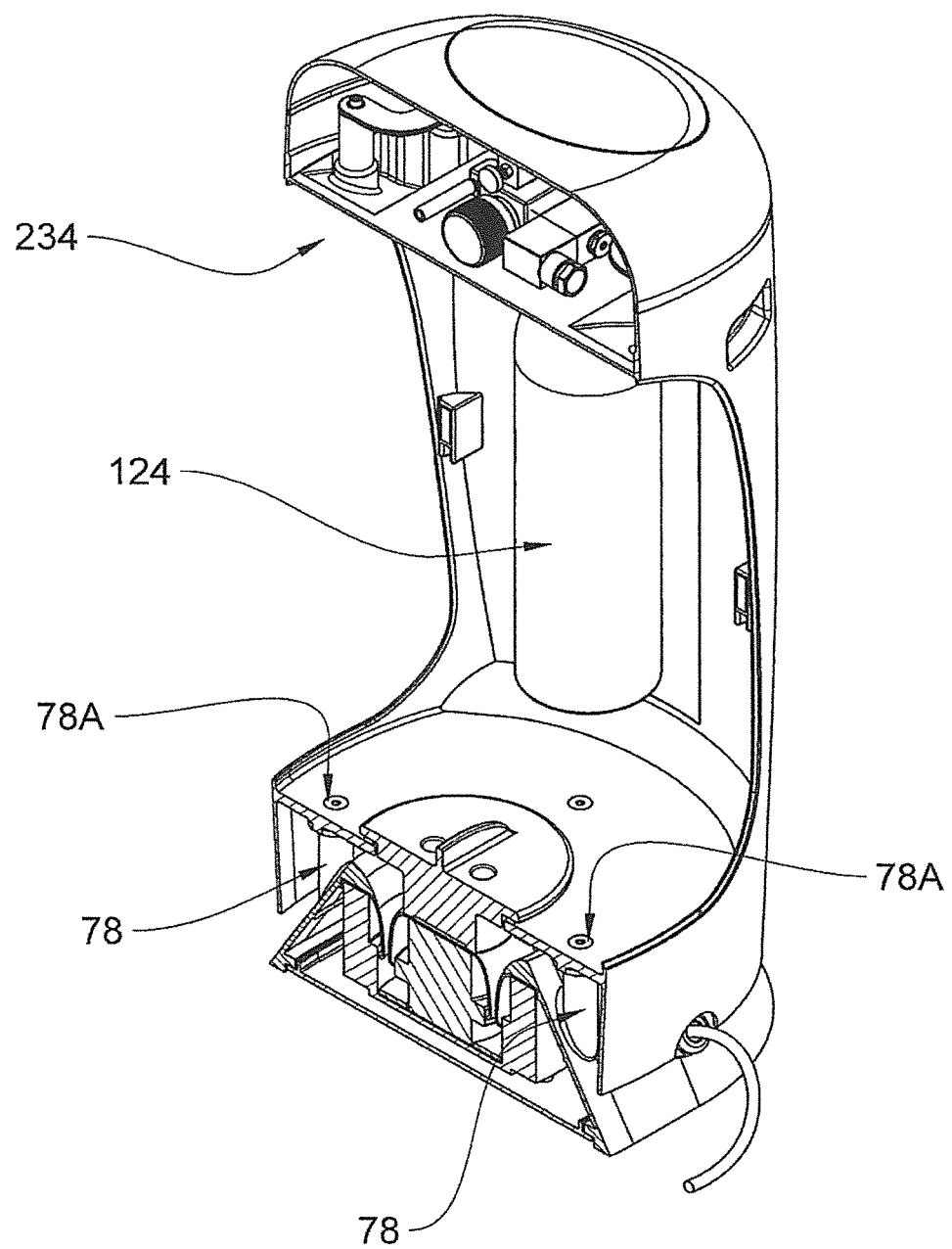
FIG. 16 is a perspective sectional view take on line 16-16 of FIG. 3D top view.

In some example embodiments, as shown in FIGS. 9 and 16, a plurality of column support structures 78 may be provided to extend between the outer body anchor structure 72 and the upper housing region 14 of the housing 12 through the insect entry zone 25a, and secured thereto by way of fasteners 72A. The column support structures 78 may provide physical support and stability for the upper housing region from the lower housing region. The internal cavity of the column may be solid or may provide a hollow cavity to convey electrical wires or tubing from the lower housing region to the upper housing region. The external column optimal traction-inhibiting surface finish, shape, color and non-reflective qualities may play a role in affecting the efficiency of the device by inhibiting the migration of bed bugs, of both sexes and all ages of development, from the lower entry base to the upper housing while encouraging navigation along the desired path with a visual line-of-sight to the heat source above the ramp summit and the stimuli from the other attractants.

While current published research suggests that bed bugs are nocturnal, research undertaken in relation to the subject disclosure indicates that bed bugs are active in the day as well as at night. In a natural setting, there is no control on how many bed bugs would be in the vicinity, if they are hungry, their sex and stage of development, procreation and life development cycle, and therefore which single attractant would play the most significant impact on attracting them.

The chart below shows another factor, the effect of attractants at different stages of bed bug development extracted from research conducted by John Anderson, Phd. (Anderson, J. F., Ferrandino, F. J., McKnight, S., Nolen, J., Miller, J. 2009. A carbon dioxide, heat and chemical lure trap for the bed bug, *Cimex lectularius*. Medical and Veterinary Entomology. 23: 99-105.)

In some example embodiments, a single attractant which may be incorporated within the device may elicit a response. For configurations in which attractants such as odor, heat, and $CO_2$ are combined, effectiveness of the device to attract bed bugs of a designated population of insects, within and/or at different stages of development, may thus be increased.

TABLE 1

Attractant Effectives based on Stage of Development

| | Stage of Development | Odor | Heat | $CO_2$ | Combination |
|---|---|---|---|---|---|
| 1 | Egg | N/A | N/A | N/A | N/A |
| 2 | First Instar Nymph | | | | |
| 3 | Second Instar Nymph | | | | |
| 4 | Third Instar Nymph | | | | |
| 5 | Fourth Instar Nymph | | | | |
| 6 | Fifth Instar Nymph | | | | |
| 7 | Adult | | | | |

Legend:
most attracted
next most attracted
least attracted
Notes:
Combined effectives maximizes range attracting adults and instar nymphs at all stages
Receptor development may account for attraction by instars sensitivity at various stages
This data is based on published a research study by: John Anderson, PhD As reported in the references below, bed bug response and influence to different colors and their ability to detect colors and vertical objects under low and complete dark conditions is another factor. The colors black and red are preferred compared to yellow, green, blue, and white. A white background contrast helped to locate bed bugs position during the test. These were are taken into consideration with selecting colors for the device interior, exterior and consumables (McNeill C. A., 2016). Vertical objects, such as the support columns, also seem to have solicited strong orientation behavior when trying to remove them from that area. (Narinderpal Singh, Mar. 6, 2015).

As seen in FIG. 6, a heat source 227 may also be positioned adjacent and/or below the insect entry zone 25a and above the insect entry summit region 19, or otherwise configured to emit radiation as shown by radiation lines at 80, and which may be visible or otherwise sensed by an approaching insect.

In some example embodiments, the heat source 227 may be deployed as a: visual infrared attractant and thermal attractant, but may also be used as a vaporizer, and may provide in some cases a dual thermal and visual infrared attractant for insects. Additionally, a heat source/element may be mounted under the replaceable pad to vaporize the odorant contained in the insect collection pad 66 where odor if incorporated therein, is also used as an attractant.

Thus, in some example embodiments, a heat source may be placed within visual sight of the insects approaching from any angle, once they reach the insect entry zone 25A, to encourage them to proceed on or climb up the inclined insect path on the inclined/ramped surface toward the heat source where a surface texture may change from a traction-enabling surface to a traction-inhibiting surface, the latter causing the insects to fall or slide into the inner passageway 22.

Figure 12:
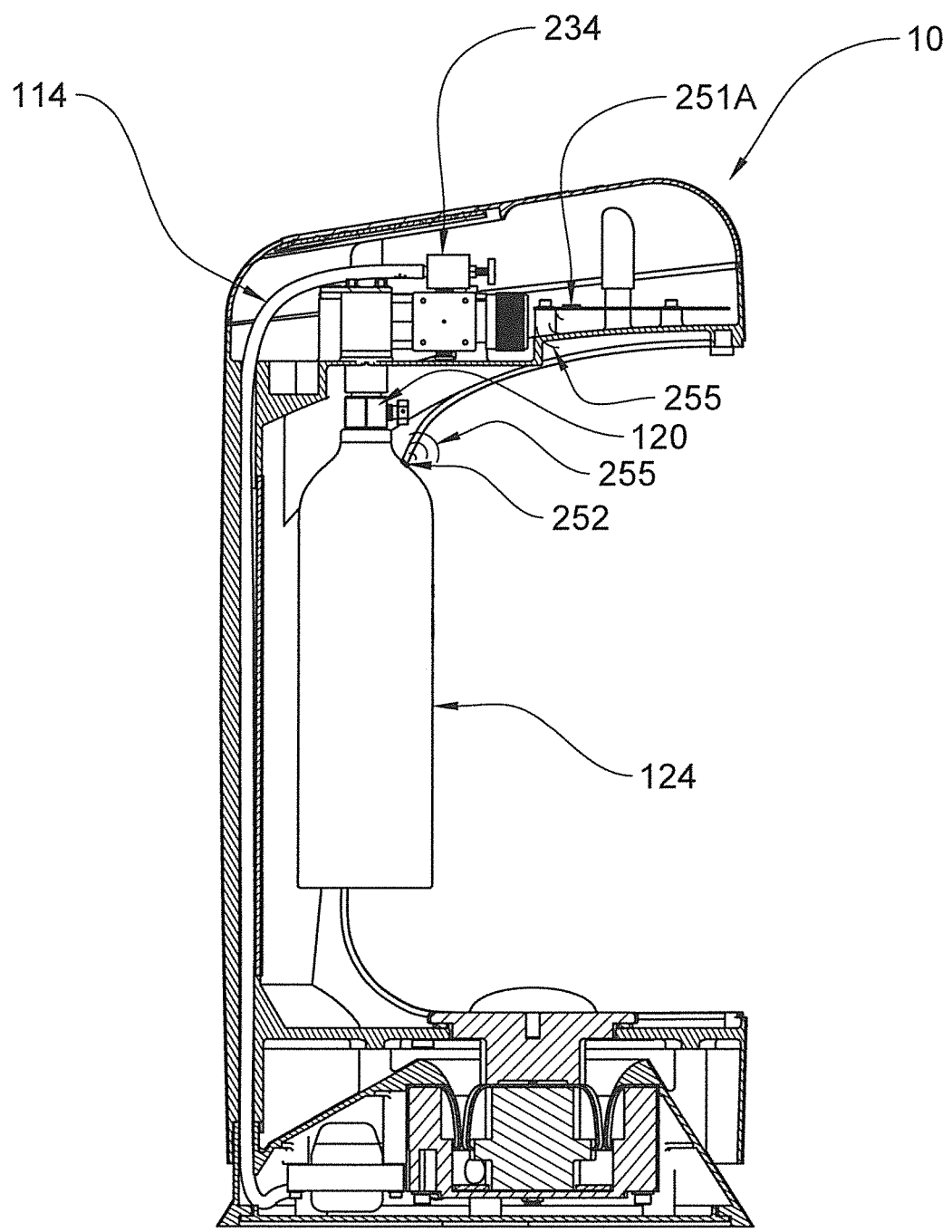
FIG. 12 is a sectional view taken along line 12-12 of FIG. 3C) top view.
Figure 15:
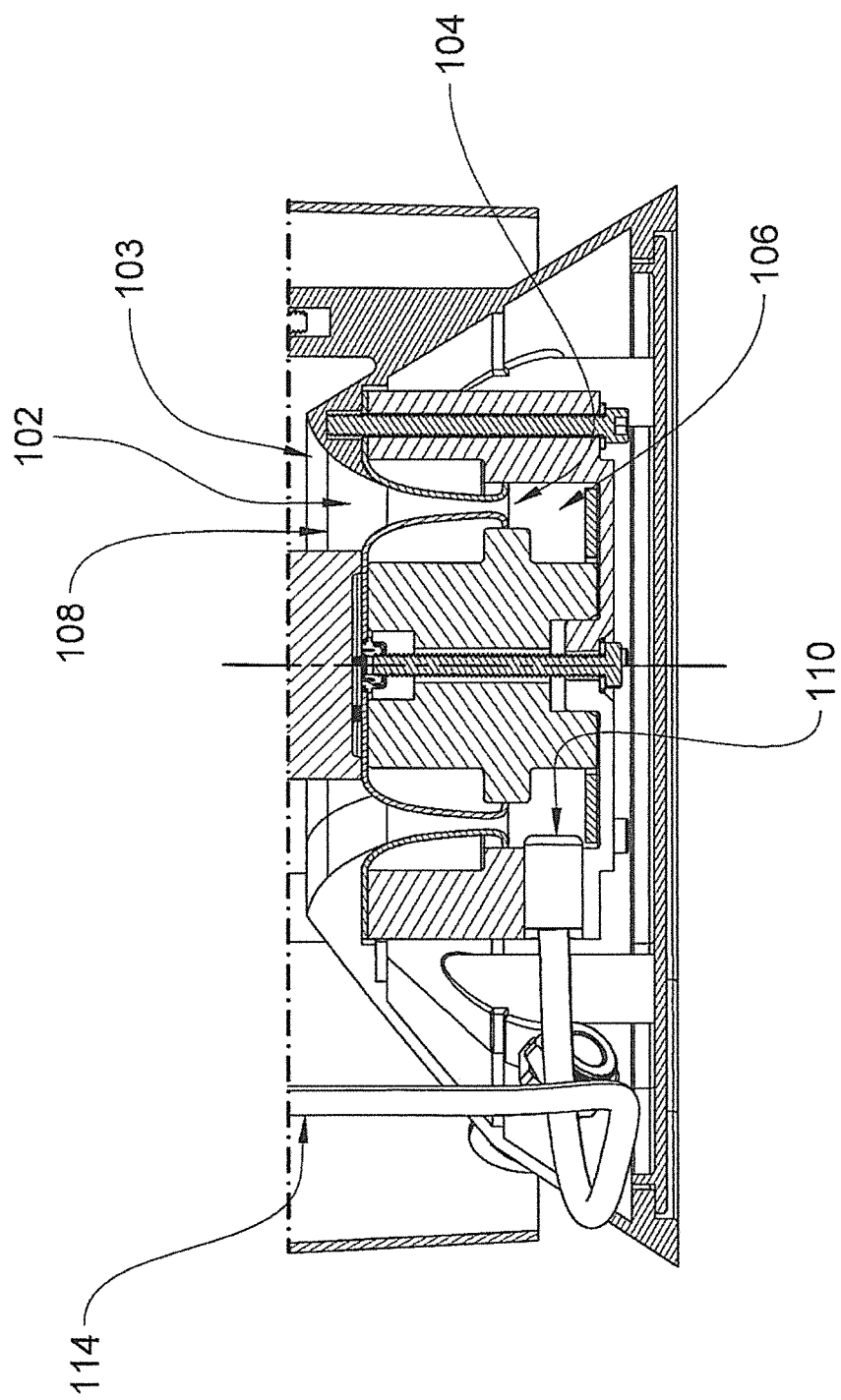
FIG. 15 is a perspective sectional view of a lower portion taken on line 15-15 of FIG. 3A) top view.

As seen in FIGS. 7, 12 and 15, a continuous or intermittent source of carbon dioxide ("$CO_2$"), such as by way of canister or cylinder 124, may be provided to supply $CO_2$, or another gaseous material as desired, and the $CO_2$ may include an attractant odor which may also include a scent, through a tube 114 and atomized at the supply port 110 terminus beneath the insect electrocution zone 36.

As seen in FIG. 7, some example embodiments, the device 10 may also be provided with a removable and replaceable source of odor beneath the insect electrocution zone 36. In one example, as shown in FIGS. 6 and 7, the insect collection pad 66 may also further comprise an attractant odor composition, or scent emitting composition which may be applied thereto or impregnated therein. In this case, the insect collection pad 66 may thus be provided with an attractant which may add an appealing odor in addition to the CO2.

Referring to FIG. 7, an electronic controller may be provided at 200 which includes or is associated with one or more detectors and/or sensors represented at 84 in communication with one or more components of the device, including the electrode power supply 222. In this example embodiment, the electronic controller 200 is configured to detect a change in an attribute of the supply of power arising from the electrocution of a target insect. At least one processor is provided at 201 to associate the change with one or more data signatures in memory to identify the target insect.

Thus, in some example embodiments, the electronic controller 200 may be configured to convey a signal encoding a target insect identity value identified by the processor 201 to an output 88. In some example embodiments, the output may be is selected from at least one of a display, an input to a computer system, and a signal transmitter.

In some example embodiments, the electronic controller 200 may be configured to enable a method of detecting an insect electrocution event, comprising providing an insect trapping device capable of killing a target insect by a measurable power signal; detecting a change in an attribute of power signal arising from the electrocution event of the target insect, and a associating the change with one or more stored values of data representing the attribute to identify a the target insect. In some example embodiments, the attribute may be selected from at least one of a change in voltage, current, and a duration associated with the change.

Figure 2:
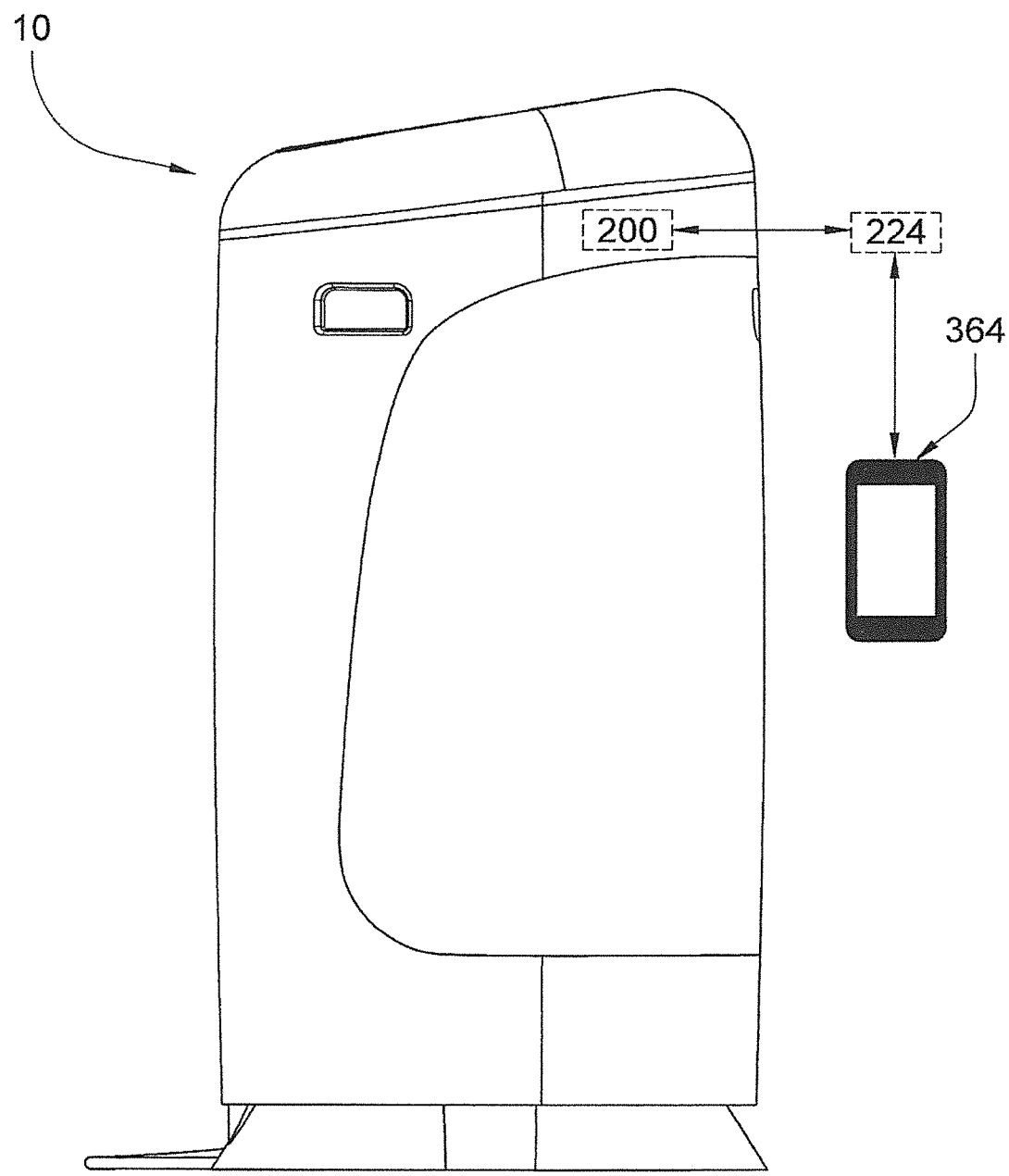
FIG. 2 is a part-schematic side view of the device of FIG. 1.
Figure 3:
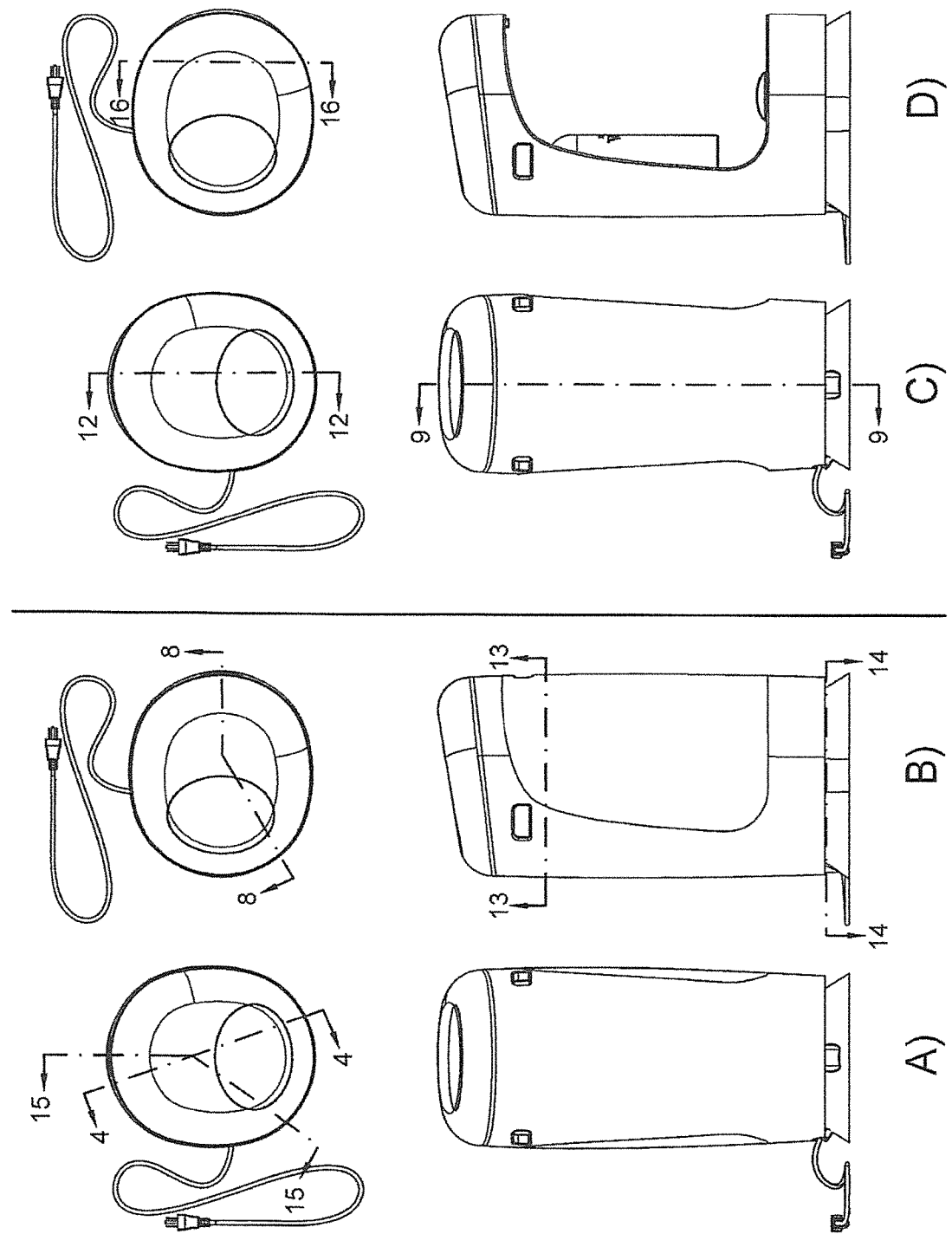
FIG. 3 are plan views and top views of the device of FIG. 1 with and without access cover 13, illustrating the cutting plane(s) used in sectional views.
Figure 23:
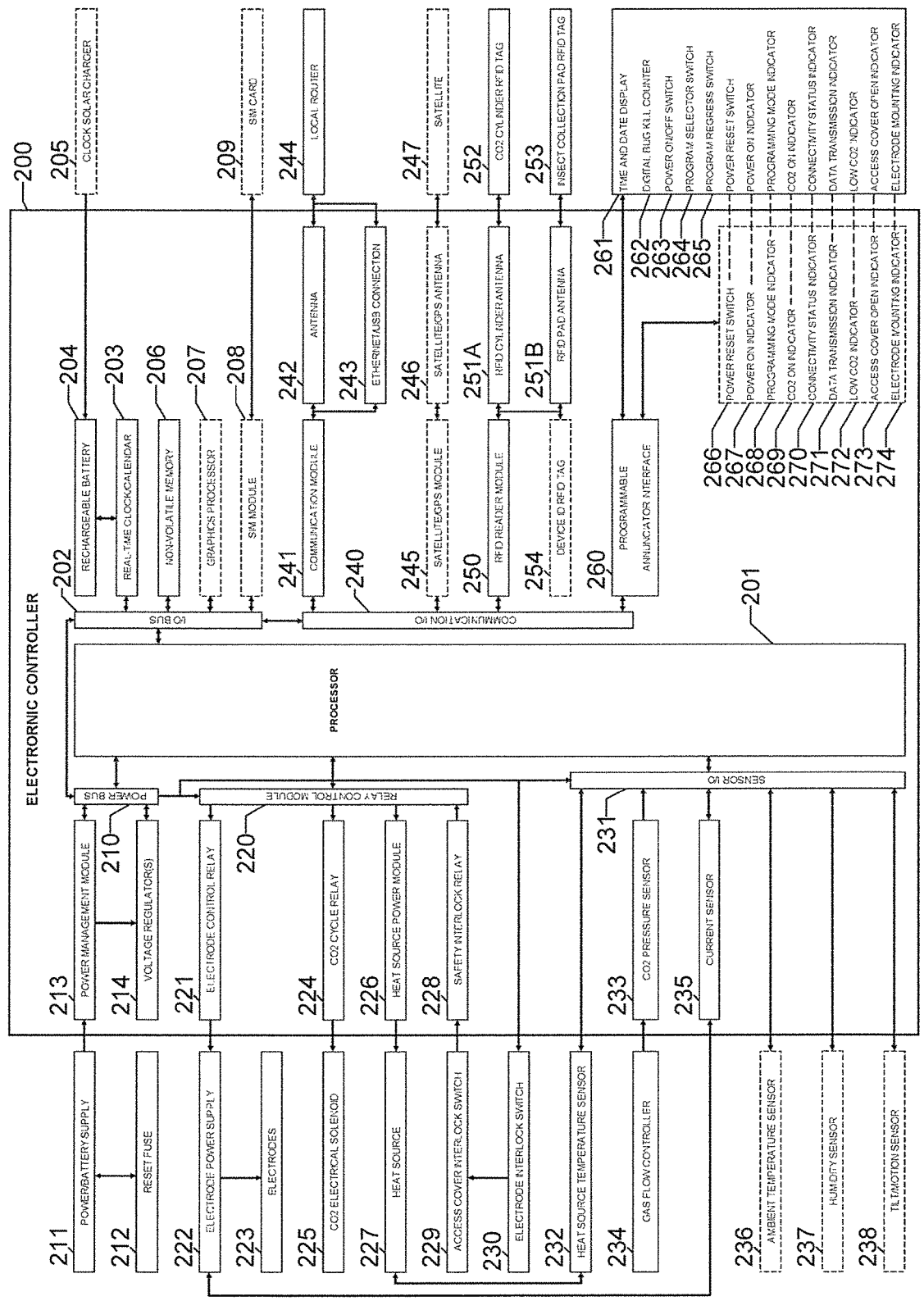
FIG. 23 is a functional block diagram of an electrical-electronic insect control system including a programmable processor with local data sensing, collection, storage and report generation functions.

Referring to FIG. 2, the electronic controller 200 may be configured to communicate directly through a communication link as shown in FIG. 23 and/or indirectly with a remote device such as a computer/smart device or phone 364, by any of a number of wireless channels such as via Bluetooth or WI-FI or a cellular network or network router shown at 244. In this case, the remote device may access or have resident therein a non-transitory computer readable medium having recorded thereon statements and instructions for execution by a processor on a remote device. The statements and instructions may comprise one or more of: configuring an instructional input on the remote device to generate following user interaction therewith corresponding to one or more instructions for configuring an insect trapping device 10; receiving from the insect trapping device, one or more signals encoding a target insect identity; and storing the target insect identity in memory.

Referring to FIG. 7, some example embodiments may be configured to handle the current flow required, the dissipation of heat that may be generated at the outer and inner electrode surface regions 30, 32 provided by the outer and inner electrode structures 40, 42 (which collectively may be referred to as the "electrodes"), and may be configured to permit and encourage the insects to fall vertically through the electrocution zone 36 and be deposited in the lower insect collection zone 25c, which may thus reduce, if not substantially eliminate, build-up of dead insects otherwise on the outer and inner electrode structures 40, 42 and prolonged shorting the high voltage circuit. A relatively high voltage low amperage, ranging for example between 1,000 and 4,000 VDC, may also provide that any parts of the insects electrocuted that may stick to the inner and outer electrode surface region(s) 30, 32 are vaporized or incinerated to a point that they do not clog the outer and inner electrode structures 40, 42.

Some example embodiments may be designed to kill male and female bed bugs of all stages of development. Bed bugs' oval shape differs between sexes and is used to differentiate between male and female bed bugs. The flattened profile before feeding is enlarged while and after feeding, and when a female contains eggs. To help appreciate the challenge and effect of development on size and the time between stages of development, the chart below presents relevant known information.

TABLE 2

Bed Bug Development

| | Stage of Development | Days | Week | Length | Feeding Habit |
|---|---|---|---|---|---|
| 1 | Egg | 12 | 2 | 1.0 mm | |
| 2 | First Instar Nymph | 7 | 3 | 1.5 mm | (begins feeding on blood) |
| 3 | Second Instar Nymph | 7 | 4 | 2.0 mm | (feeds on blood) |
| 4 | Third Instar Nymph | 7 | 5 | 2.5 mm | (feeds on blood) |
| 5 | Fourth Instar Nymph | 7 | 6 | 3.0 mm | (feeds on blood) |
| 6 | Fifth Instar Nymph | 7 | 7 | 4.5 mm | (feeds on blood) |
| 7 | Adult | | 8 | 5.5 mm | (feeds on blood) |

Some insects require blood in order to reproduce. An adult bed bug may live for over a year without feeding on blood. However, both male and female bed bugs feed on blood at all stages of development and require feeding on blood to reach each successive stage of development. Availability of a source of blood or lack of it determines the length of time between stages of development which can be accelerated if an ample supply is readily available.

The female must reach the adult stage to produce eggs. The number of eggs and the reproduction cycle can increase given optimum conditions such as source of food and availability for to copulate with one or more males. Therefore, elimination of females prior to and at the adult stage directly and proportionally impacts growth of the local population or spread in to other locations.

Some example embodiments may be configured to exterminate male and female bed bugs of all stages of development. FIG. 17 illustrates a typical size distribution of a designated population of the insect in relation to the designated spacing between the opposing inner and outer electrode surface regions. Rather than maintaining a fix spacing or relying on the migration across a traction-enabling surface, some example embodiments provide traction-inhibiting surfaces and allows gravity to assist during a vertical decent entrapment, falling and electrocution of different sizes and at different points of axis while passing between the opposing electrodes. In this instance, the vertical distance from the top to the bottom of the electrodes at any given range of spacing provides sufficient dwell time to ensure electrocution while falling. Thus, in some example embodiments, a vertical design may enable a self-clearing effect, allowing both incapacitated (when an oxygen depleted environment is present) and electrocuted bed bugs to fall through the inner and outer electrode surface regions and into the insect collection zone, thus preventing a buildup of bugs and/or continuous discharge of power between the opposing inner and outer electrode surface regions. The designated spacing also aligns the collection of bed bugs on the insect collection pad surface below.

Figure 24:
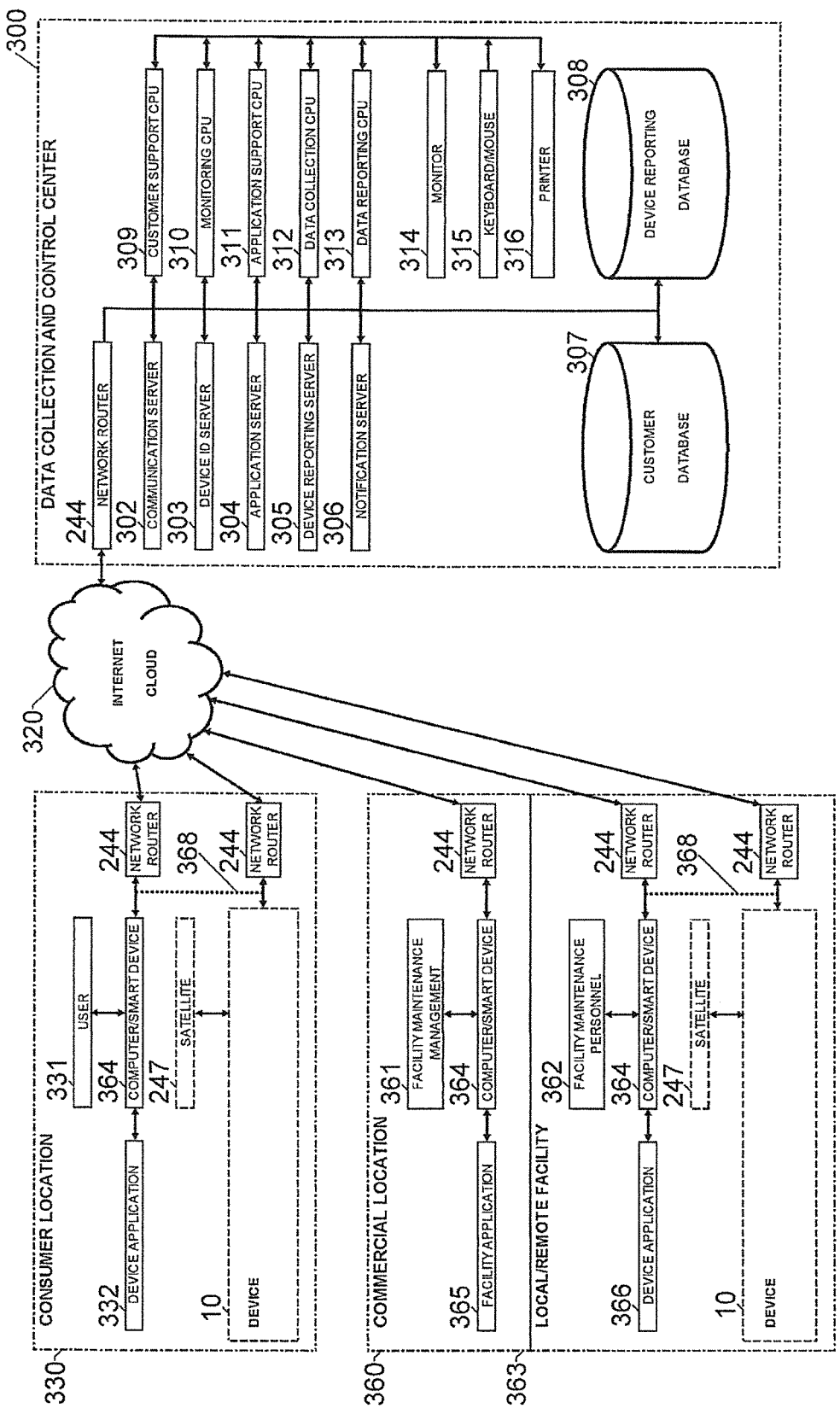
FIG. 24 is a schematic diagram of the report collection, generation, and reporting systems communicating directly with a remote data collection, monitoring, storage and control center.

Referring to FIGS. 23 and 24, in some example embodiments, should a larger insect such as a cockroach pass through the device such as shown at 10, the electronic controller 200 may be configured to sense a prolonged discharge and disconnect the electrode control relay which supplies power to the electrode power supply 222 which in turn supplies the high voltage to the electrodes 223, and the processor 201 would record the event details in the non-volatile memory 206 and indicate on device's programmable annunciator interface 260 and report to the user 331, 361, 362 through their computer/smart device 364 and/or data collection and control center 300, that a visual inspection and cleaning is required.

Referring to FIGS. 7 and 23, some example embodiments may provide the inner passageway structure 20 with the electrode surface regions 30, 32 to be energized continuously during an operative period or otherwise when a power/battery supply 211 is supplied and the programmable annunciator interface 260 power on/off switch 263 is turned "ON."

Referring to FIGS. 23 and 24, some example embodiments may provide detection and relative bed bug age information. This may be useful information that may allow the electronic controller 200, and at least one processor 201, or at least one monitoring CPU 310 to not only detect, report but also control the mode of operation for the device such as on standby, monitoring, or active modes. Providing an indication on the age by measuring the intensity and duration of discharges along with known life cycle characteristics of the bed bugs which may help determine if the infestation is new or existing and the effectiveness of extermination along with prediction of consumables and eradication of infestation.

In some example embodiments, by measuring, recording, and comparing the intensity and duration of an electrode discharge output attribute killing an instance of a target of a population of insects, the device may identify thus both the electrocution of an instance of a bed bug killed and can provide an indication on the stage of development of a target insect, thus helping to determine if the infestation is new or existing, the effectiveness of extermination, along with prediction of consumables.

In some example embodiments, a motion or temperature sensor may not be used for detection of a bed bug in a trap, since the inquisitive nature bed bugs may cause them to potentially enter and re-enter a trap a number of times, which in that instance may produce a less accurate, or inaccurate, count of bed bugs trapped. In addition, some example embodiments may not rely on a beam to detect and/or kill, as the beam may in some cases unpredictably pass through the semi-transparent bodies of unfed bed bugs.

Thus, in some example embodiments, the bug kill counter may provide a value of the number of insects eliminate, for instance by specifically recording the bugs who enter and are killed, providing a more accurate assessment and record of activity and elimination of a population of bed bugs, and a prediction of how long to eradicate a population of bed bugs through elimination.

Referring to FIGS. 23 and 24, in some example embodiments, at least one processor 201, and at least one processor 201 local to the device 10 or a computer/smart device 364 may be in communication therewith, and/or may be provided or accessed to communicate with a remote user 331 or a facility maintenance personal 362 or a service technician at the data collection and control center 300 at a remote location through a wired or wireless network connection, either directly through a communication link 368 or indirectly through a network router 244 by way of local network protocols such as Bluetooth, Wi-Fi or via an internet protocol.

Figure 11:
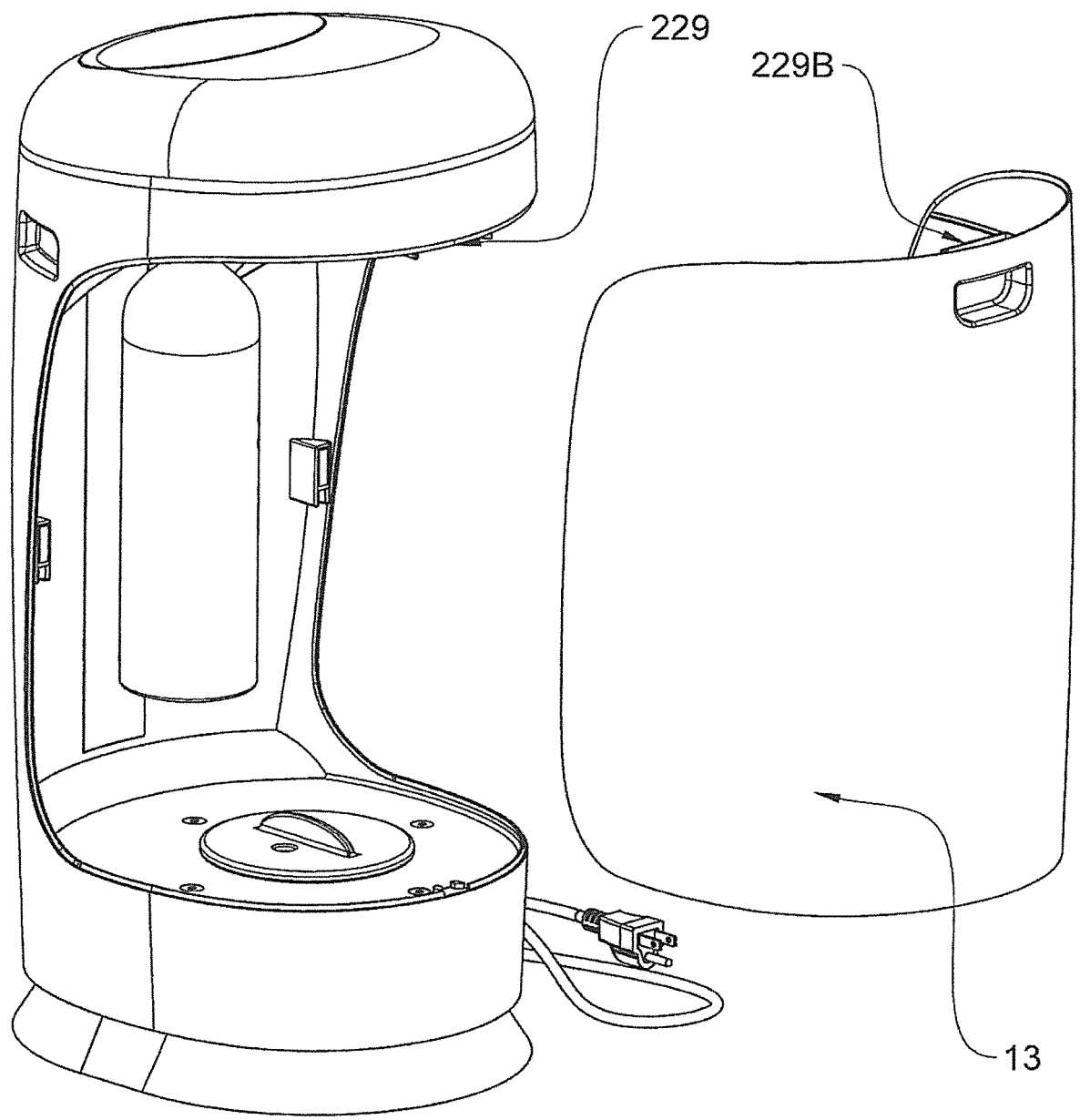
FIG. 11 is a partly exploded perspective view of another insect trapping device.

Referring to FIGS. 1, 11 and 23, in some example embodiments, at least one access cover magnet 229b mounted and/or recessed in the access cover 13 may provide a magnetic field so as to close at least one reed sensing interlock or proximity access cover interlock switch 229 mounted adjacent inside the housing 10, is used complete the electrical safety circuit when in the mounted position and open the electrical safety circuit to the safety interlock relay 228 when removed, thus supplying or disconnecting the power to the: electrode control relay 221 that controls the supply of electrical power to the electrode power supply 222 which in turn delivers the high voltage power to the electrodes 223; $CO_2$ cycle relay 224 that controls the supply of electrical power to $CO_2$ electrical solenoid 255 that controls the supply flow of $CO_2$; and the heat source power module 226 that supplies electrical power to the heat source 227; thus effectively disconnecting power to the electrodes 223, $CO_2$ electrical solenoid 255 and heat source 227, while being serviced or should the user forget to replace the access cover 13 after inspection or cleaning.

Referring to FIGS. 6, 8, 9 and 23, in some example embodiments, at least one magnet may be recessed in the bottom underside of the inner body structure 50 and whose magnetic field is used to close a reed sensing electrode interlock switch 230 mounted under the outer base structure 60 which is connected in series with the access cover interlock switch 229 and completes the electrical safety circuit when the inner body anchor structure 70 is in the mounted position and opens the electrical safety circuit when removed, thus supplying or disconnecting the power to the electrode control relay 221 that controls the supply of voltage to the electrode power supply 222 which delivers the high voltage power to the electrodes 223 while being serviced or should the user forget to replace the inner body anchor structure 70 assembly after inspection or cleaning.

Referring to FIGS. 23 and 24, in some example embodiments, one or more safety interlocks such as electrode interlock switch 230 and/or access cover interlock switch 229 may be electrically connected and in communication with at least one processor 201, at least one processor local to the device 10 monitored and/or in communication therewith, which can monitor the state and change of state of the switches and record such as an event to the non-volatile memory 206 and may record such an event to the data collection and control center 300.

In some example embodiments, as shown in FIGS. 12 to 15, another example of the device is shown at 10 for trapping an insect, wherein the inner passageway may be considered a chute 102 having an inlet 103 to receive an insect and to deliver the insect under a force of gravity to an outlet 104. A chamber shown at 106 may be configured to be in communication at a transition 108 below the outlet 104. At least one $CO_2$ supply port 110 is in fluid communication with the chamber 106 to deliver $CO_2$ thereto. In this case, the chamber is configured to contain the $CO_2$ therein and to form a transitional atmospheric environment between a $CO_2$ environment in the chamber and atmospheric oxygen external to the inlet chute 102, so as to render unconscious and asphyxiate an insect in the chamber 106.

As reported in the below reference, all animals require oxygen for cellular respiration—the conversion of food materials to energy useable by living cells (Randall et al., 2002). Prolonged exposure to an anoxic environment (no oxygen) will inflict high mortality rates in male and female bed bugs of all stages of development. (Randall, D., Burggren, W., French, K. 2002. Eckert Animal Physiology Mechanisms and Adaptations 2nd ed. Chapter 3: Molecules, Energy, and Biosynthesis. W.H. Freeman & Co. New York, N.Y. pp. 736.)

In some example embodiments, the device may include a gas flow controller 234 to deliver the $CO_2$ through the tube 114 to (and/or to maintain the CO2 in) the chamber 106, for example at a designated molecular density sufficient to displace substantially all oxygen from the chamber 106, to form a substantially oxygen depleted environment therein, sufficient to asphyxiate insects arriving in the chamber from the inlet chute 102.

Figure 13:
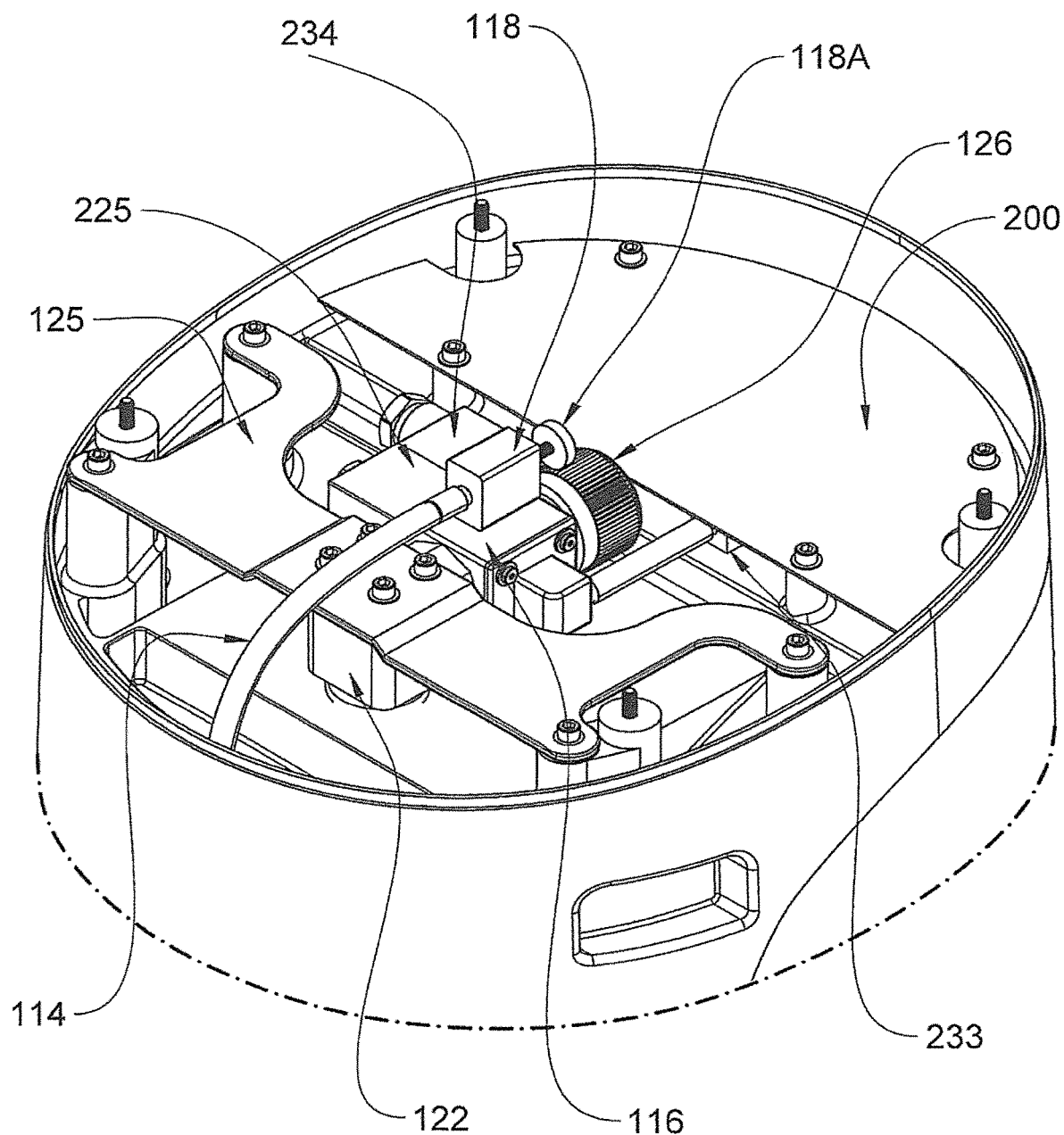
FIG. 13 is a perspective view taken along line 13-13 of the device as viewed in FIG. 3B)

As can be seen in FIGS. 12, 13 and 15, the supply port 110 is in coupled with a CO2 supply tube 114 which may terminate at a needle valve 118 and/or limiting orifice. The needle value 118 communicates with gas flow controller 234 which may be supported by mounting bracket 125 and which may be provided with a CO2 electric solenoid 225 and a regulator 116 which provides a threaded fitting 122 to receive fluidly connect with the removable and replicable pin valve 120 outlet of a CO2 canister or cylinder 124.

The gas flow controller 234 regulator 116 discharge pressure setting may be preset, automated or manually adjustable as shown in FIG. 13 using a knob 126, to provide a primary reduction from the high pressure supplied from the CO2 cylinder 124 to a lower consistent downstream gas pressure. The needle valve/limiting orifice 118 may be manually fixed, set or adjustable as shown to provide a fine calibrated secondary reduction of gas pressure and low flow rate which is to be maintained. Combined pressure settings and flow rate of the regulator 116 and the needle valve/limiting orifice 118 are set and adjusted according to the designated molecular density of CO2 to be delivered to and, in this case, maintained a predetermined discharge flow in the chamber 106 when the CO2 electric solenoid 225 is energized and the integral valve is thus open.

Referring to FIG. 12, in some example embodiments, a CO2 cylinder 124 capacity, size, operating pressure and material may vary. The pin valve 120 external thread pitch and diameter may vary, which may depend on a number of factors such as the size of the device, the size of the target insects therefor, and/or one or more features of a designated commercial or residential application. The pin valve 120 may also comprise but is not limited to include a high-pressure safety burst disk, pressure gage and "ON/OFF" and/or adjustable valve.

Referring to FIG. 12, 23, in some example embodiments, CO2 cylinder 124 identification and information may be provided though an integrated, affixed or mounted circuit chip or other means such as a passive radio frequency identification (RFID) tag referred to as the CO2 cylinder RFID tag 252, that can communicate, depicted as RFID radio frequency waves 255, to the control circuit processor 201 in the device 10 through the RFID reader module 250 and the attached RFID cylinder antenna 251a.

In some example embodiments, a programmable annunciator interface 260 may be provided to facilitate but is not limited to: user programming date, time, router access data, mode for control of operation, times of operation and with indication of the number of bugs killed, historic operation data, power on, CO2 on, low CO2, access cover open, electrode installed, internet connectivity and data transmission activity.

In some example embodiments, a programmable annunciator interface 260 may be a tactile or touch screen and may include but is not limited to:
  Time and Date display 261
  Digital bug kill counter 262
  Power ON/OFF switch 263
  Program Selector switch 264
  Program Regress switch 265
  Power Reset switch 266
  Power ON indicator 267
  Programming Mode indicator 268
  CO2 ON indicator 269
  Connectivity Status indicator 270
  Data Transmission indicator 271
  Low CO2 indicator 272
  Access Cover Open indicator 273
  Electrode Mounting indicator 274

FIG. 23 provides a functional block diagram of the electronic controller 200 including a programmable processor 201 with local data sensing, collection, storage and report generation functions as described:

Electronic Controller

The electronic controller 200 printed circuit board whose location within the device 10 is generally represented in FIG. 13 may be configured to use conductive tracks, pads and other features etched and connected from one or more sheet layers of copper laminated between sheet layers of a non-conductive substrate which may mechanically support and electrically connect electronic or electrical components such as but not restricted to the:
  processor 201
  power bus 210
  power management module 213
  voltage regulator(s) 214
  relay control module 220
  electrode control relay 221
  CO2 cycle relay 224
  heat source power module 226
  safety interlock relay 228
  sensor I/O 231
  CO2 pressure sensor 233
  current sensor 235
  rechargeable battery 204
  real-time clock/calendar 203
  non-volatile memory 206
  graphics processor 207
  sim module 208
  communication I/O 240
  communication module 241
  antenna 242
  ethernet/USB connection 243
  Satellite/GPS module 245
  Satellite/GPS antenna 246
  RFID reader module 250
  RFID cylinder antenna 251a
  programmable annunciator interface 260

Processor

The programmable processor 201 may be configured to respond to and process basic instructions and is imbedded on the electronic controller 200 printed circuit board and be responsible for automated operation, monitoring and reporting of the insect trapping device 10 and has electronic leads to the power bus 210, I/O bus 202, communication I/O 240, relay control module 220 and the sensor I/O 231 and controls the values displayed and monitors for any user inputs on or through the programmable annunciator interface 260. The primary functions of the processor 201 may include: fetch, decode, execute and read/writeback.

Referring to FIGS. 23 and 24, the programmable processor 201 may be configured to be controlled by, and/or execute on power-up, on wake-up or while in sleep mode, program code stored in the non-volatile memory 206 which may be programmed, updated locally or remotely, and facilitates user initialization, configuration, operational and parameter setting adjustments, formulates and records time-stamped entries in the non-volatile memory 206 for any events, sensor inputs, or alerts requested by the program or generated from the operation of an insect trapping device 10 and is involved with the initial configuration and registration through a device application 332, 336 on a user computer/smart device 364 including user and device specific information which is stored in the local non-volatile memory 206 and may be uploaded, registered and stored in the remote data collection and control center 300 customer database 307.

If internet connectivity is provided and configured by the user and there is connectivity or when connectivity is established or re-established such as during network disruption the processor 201 may be configured to organize, prioritize, and initiate transmission of events, alerts and status to the data collection and control center 300 device reporting database 308 immediately at the time of the event and/or at predetermined program time intervals which in turn will transmit upon receipt alerts and status information to a registered user's device application 232, 366 and may transmit to a facility application 365 providing both current and historical data.

Power

The power/battery supply 211 may be supplied externally from either an electrical wall outlet and/or a alternating current source and/or solar rechargeable battery through a power cord 17 shown in FIG. 1 and/or internal alternating current and/or solar rechargeable battery for the insect trapping device 10 in conjunction with a reset fuse 212 to provide protection to the electrical system in case of a voltage overload condition for the external supply or a short or amperage overload condition within the device.

Power Management Module

The power management module 213 may be configured to connect, monitor and control the electrical supply voltage to the voltage regulator(s) 214, which filters the voltage signal, converts from direct current to alternating power/battery supply 211 as needed and alternating current to direct current as needed and regulates the voltage level delivered to various components within the device 10 according to their specifications directly to and/or through the power bus 210.

The Power Bus

The power bus 210 is a power supply channel and refers to one or several separate and electrically isolated conductive power tracks identified by specific voltages which supply power to imbedded or mounted components on or electrically connected to the electronic controller 200 and delivers power from the voltage regulator(s) 214 to but not restricted to the processor 201, I/O bus 202, communication I/O 240, relay control module 220 and the sensor I/O 231.

I/O Bus

The I/O bus 202, has leads that convey power and electrical signals to and from the programmable processor 201 and other components such as but not restricted to the real-time clock/calendar 203, non-volatile memory 206, graphics processor 207, sim module 208.

Real-Time Clock/Calendar

The programmable real-time clock/calendar 203 module with a serial real time clock and calendar chip may be configured to maintain hours, minutes and seconds, as well as, day, month and year information automatic compensation for leap-years and for months with fewer than 31 days and may receive power through the I/O bus 202 or an attached rechargeable battery 204 and can keep track of the time even if the device 10 is turned off by means of the power on/off switch 263 and/or disconnect the main power 211 as when servicing and continue to operate in any sleep or operating cycle mode, and can be monitored by the processor 201 to wake up the device 10 from sleep modes when electrical power is supplied to the device 10.

Rechargeable Battery

The rechargeable battery 204 maintains a constant voltage supply to the real-time clock/calendar 203 in the event of a power interruption should device 10 is turned off by means of the power on/off switch 263 and/or externally disconnected from the main power supply 211 and may receive power to recharge from either the I/O bus 202 and/or the clock solar charger 205.

Clock Solar Charger

The clock solar charger 205 may be mounted on the outside casing of the device 10 so that it can convert light, from sources external to the device 10 such as the sun or lights in a room, to electrical energy which can then be stored in the rechargeable battery 204.

Non-Volatile Memory

The read/writable non-volatile memory 206 may be used to store and/or retrieve operational code, identification data, configuration data and historical operational event activity data with a timecode.

Graphics Processor

The graphics processor 207 may be configured to rapidly create images in a frame buffer which may be derived from data stored in the non-volatile memory 206 and/or sensor I/O 231 input data manipulated and altered by the processor 201, intended for output to a display on the programmable annunciator interface 260.

Sim Module

A sim module 208, may be configured to facilitate the insertion and connection to the I/O Bus 202 by a removable read/writable sim card 209 permitting the downloading and storage of historical data retrieved from the on-board non-volatile memory 206 which may provide a method to off-load stored historical data and/or provide diagnostic historical data that can be used to identify and/or isolate but not limited to mechanical, electrical, operational program, component, or connectivity malfunctions inside or related to the device 10.

Communication I/O

The communication I/O 240 leads convey power and and/or electrical communication signals to and from the programmable processor 201 and other components such as but not restricted to the I/O bus 202, communication module 241, satellite/GPS module 245, RFID reader module 250, and programmable interface 260.

Communication Module

The communication module 241 if incorporated in the electronic controller 200, may include the necessary electronic components and configuration to operate independently and/or in conjunction with the processor 201 and processing code stored in a separate memory chip and/or in the non-volatile memory 206 to permit and facilitate transmission, processing and receipt of data and connectivity to the device 10 as indicated in FIG. 24 which may be through a direct link 368 such as a USB or phone line and/or but not restricted to a Wi-Fi, Bluetooth, Ethernet/USB connection 243, or phone line connection, which can identify network signal existence, strength, local router ID, location, data encryption and password, which can facilitate receiving and transmission of communication data through a local network router 244 to the internet cloud 320 and/or through a satellite 247, to but not restricted to other local devices 10, computer/smart devices 364 and the remote data reporting and collection center 300.

Satellite/GPS Module & Antenna

The Satellite/GPS module 245 if incorporated in the electronic controller 200, may facilitate connectivity and one-way and/or two-way communication through an attached Satellite/GPS Antenna 246 with an external satellite 247 transmission through the communication i/o 240 requested, transmitted and receive data through the communication module 241, which information data may be used to provide the physical location identification of the device 10, which data may then be recorded with timestamp during initial configuration and setup of the device 10, on a pre-set programmed interval or by request from the remote data reporting and collection center 300, and retained in non-volatile stored memory 206 and may be reported to or retrieved from the remote data reporting and collection center 300.

RFID Reader Module

RFID reader module 250 if incorporated in the electronic controller 200, may facilitate connectivity, receive and transmitted data through an integrated and/or attached RFID cylinder antenna 251a to a CO2 cylinder RFID tag 252 to determine information such as but not restricted to the cylinder identification number, manufacturing facility, cylinder DOT certification data and expiry date, cylinder manufacturing date, cylinder capacity, if a cylinder has been installed, level of carbon dioxide inside the cylinder, carbon dioxide charging facility, carbon dioxide charge or recharge dates, and/or an insect collection pad RFID tag 253 to determine information such as but not restricted to the pad identification number, manufacturing facility, manufactured date, life expectancy, point of purchase, if it has been installed, installation date, expiry date, and if it has been previously used.

Programmable Annunciator Interface

The programmable annunciator interface 260 may be incorporated on the electronic controller 200, with some of the indicators and switches as shown incorporated on the electronic controller 200, and/or to an attached interface which may provide user input and output through a tactile pad, touch screen, buttons, lights or other means on the external surface of the device 10 to allow control, setting or adjusting programming functions, and visual indication of but not restricted to time and date display 261, digital bug kill counter 262, power on/off switch 263, program selector switch 264, program regress switch 265, power reset switch 266, power on indicator 267, programming mode indicator 268, CO2 on indicator 269, connectivity status indicator 270, data transmission indicator 271, low CO2 indicator 272, access cover open indicator 273, electrode mounting indicator 274 and may also have sensors to illuminate the interface at night upon touch and may also provide dimming control adjustment setting and may automatically dim after a set interval after a user has touched the interface surface.

Relay Control Module

The relay control module 220 may be configured to be controlled and monitored by processor 201 which runs the program stored in the non-volatile memory 206 and verifies signal inputs and the current time from the real-time clock/calendar 203, provides a number of functions to control the power supply from the power bus 210 to attached components and/or receiving power signals from components, such as but not limited to:

a) Electrode Control Relay

The electrode control relay 221 controlled by the relay control module 220 to supply or disconnect power from the voltage regulator 214 to the electrode power supply 222 which converts and supplies DC voltage to energize the electrodes 223.

b) CO2 Cycle Relay

The CO2 cycle relay 224 controlled by the relay control module 220 to supply or disconnect power from the voltage regulator 214 to the CO2 electric solenoid 225 which controls the discharge of the carbon dioxide. The duration of on/off cycles is based on a pre-programmed or programed time cycle value(s) stored in the non-volatile memory 206 and regulated by the programmable real-time clock/calendar 203 time values.

c) Heat Source Power Module

The heat source power module 226 which may be controlled by the relay control module 220, receives power from the voltage regulator 214 that it then may turn on/off and/or regulate and control the signal amplitude and pulse wavelength modulation of the electrical power supplied to the heat source 227 based on input from the heat source temperature sensor 232 connected to the sensor I/O 231, when the ambient temperature around the device 10 is below the programmed lower limit value stored in the non-volatile memory 206. If the ambient temperature around the device 10 is above the programmed upper limit value stored in the non-volatile memory 206 then no power is supplied to the heat source 227.

d) Heat Source

The heat source 227 and attached or imbedded heat source heat source temperature sensor 232 may be connected electronically but mounted externally from the electronic controller 200 within the device 10 and is intended not to heat air but rather provide a warm surface along the exposed element surface and maintain a specific temperature. The heat source 227 may be constructed from a number of electrically conductive or semi-conductive materials providing a low wattage heating element with a thermal isolating backing to inhibit the transfer of heat energy.

e) Electrode Interlock Switch

The electrode interlock switch 230 mounted externally from the electronic controller 200, as shown in FIGS. 9 and 23 may be but is not restricted to a proximity or reed sensing switch that detects removal and/or re-placement of the inner body anchor structure 70, as shown in FIG. 9, typically done during inspection and servicing. One side of the electrode interlock switch 230 normally open contacts receives power from the power bus 210 and the switch closes when the inner body anchor structure 70 is mounted properly, thus supplying power to one side of the access cover interlock switch 229 normally open contacts, which may as show be connected in series.

f) Access Cover Interlock Switch

The access cover interlock switch 229 as shown in FIG. 11 may be mounted externally from the electronic controller 200 but mounted or embedded in the device 10 as shown in FIGS. 11 and 23, may be but is not restricted to a proximity or reed sensing switch that detects removal and/or re-placement of the access cover 13 typically done during inspection and servicing. One side of the access cover interlock switch 229 normally open contacts may receive power from the electrode interlock switch 230 and which may as show be connected in series, and closes when the access cover 13 is mounted properly, thus supplying power to the safety interlock relay 228.

g) Safety Interlock Relay

The safety interlock relay 228 may be configured to provide a mechanical method to insure, that the electrode interlock switch 230 and/or the access cover interlock switch 229 contacts are in the closed position, before the safety interlock relay 228 can be activated, insuring that both the inner body anchor structure 70 and access cover 13 as shown in FIGS. 9 and 11 are mounted in the correct position prior to supplying a power signal through its normally open contacts to the relay control module 220 which is also being monitored by the processor 201.

If the safety interlock relay 228 is in a deactivated state through loss of power to the device 240, and power from the power management module 213 in case of a reset fuse 212 overload, the power on/off switch 263 position, and/or of power through the electrode interlock switch 230 and/or access cover interlock switch 229 connected in series, the safety interlock relay 228 contacts will mechanically revert to a normally open neutral position immediately overriding any programed settings and insure that power if present is disconnected to the electrode control relay 221 in turn the electrode power supply 222 thus disconnecting power supplied the electrodes 223, the CO2 cycle relay 224 which supplies power to the CO2 electric solenoid 225 thus shutting off the discharge of carbon dioxide, and the heat source power module 226 which disconnects power supplied to the heat source 227. Thus, the deactivated state insures that power to the electrodes 223, heat source 227 and the CO2 electric solenoid 225 is prohibited.

If the processor 201 determines that either the access cover 13 and/or the inner body anchor structure 70 is removed and/or is not mounted properly from loss of signal from the safety interlock relay 228, and/or access cover interlock switch 229, and/or electrode interlock switch 230 a power signal may be sent to the programmable annunciator interface 260 electrode mounting indicator 274 and/or access cover open indicator 273 alerting the user to that relative condition.

Sensor I/O

The sensor I/O 231 bus is controlled and monitored by the processor 201 which runs the program stored in the non-volatile memory 206 and verifies signal inputs and the current time from the real-time clock/calendar 203, provides a number of functions to control the power supply from the power bus 210 to attached components and/or receiving power signals from components, such as but not limited to:

a) Heat Source Temperature Sensor

The heat source temperature sensor 232 is mounted externally from the electronic controller 200, and is attached to or integrated with heat source 227, may be an RTD, thermocouple, thermistor or solid-state diode analog temperature sensor, whose digital or analog data is converted if needed to provide a digital input to the device 10 processor 201 which is converted to a value and then recorded with a timestamp and stored the non-volatile memory 206 and intern controls heat source power module 226, which supplies and regulates the electrical power supplied to the heat source 227.

b) CO2 Pressure Sensor

As also shown in FIGS. 12, 13, and 23, the CO2 pressure sensor 233 may if incorporated in the insect trapping device 10 may be mounted on and/or electrical integrated with the electronic controller 200 or mounted externally, mechanically connected directly or by means of a hollow metal or rubber tube 114 connection to the gas flow controller 234 to measure the internal gas pressure within the gas flow controller 234 downstream of the gas regulator 116 but upstream of the CO2 electric solenoid 225 which may provide an active output signal of the pressure and/or used to activate a normally open electrical switch within the CO2 pressure sensor 233 which may close when the pressure is above a predetermined low set point and may open if above a maximum predetermined set point, the CO2 pressure sensor 233 is electrically connected to the sensor I/O 231 to provide a digital or analog pressure reading signal which is converted to a digital input value or provides a normally open switch which receives a power signal from the sensor I/O 231, when closed the switch returns the signal back to the sensor I/O 231 indicating that a cylinder 124 containing carbon dioxide is connected and/or a supply of carbon dioxide is available. Should the cylinder be removed and/or the volume of gas within the cylinder becomes depleted the lack of pressure and/or pressure below the lower set limit is reached, the switch returns to its neutral open state and the power signal returning back to the sensor I/O 231 drops.

The returning analog, digital or pressure signal or lack of it is monitored by the processor 201 which checks at a regular interval and records both states with a timestamp to the non-volatile memory 206 and sends a power signal to the programmable annunciator interface 260 Low CO2 indicator 272 alerting the user that relative condition and if there is connectivity transmits an alert to the data collection and control center 300 which in turn will transmit an alert to the user's device application 332, 365, and/or 366 regarding the current status change.

The CO2 pressure sensor 233 may also have an upper hi-limit setting and/or the processor 201 may detect that a pressure reading is above an acceptable and safe operation level and will proceed to shut down the device 10 immediately and if there is connectivity transmits an alert to the data collection and control center 300 which in turn will transmit an alert to the user's device application 332, 365, and/or 366 regarding the current status change.

c) Current Sensor

The current sensor 235 electrically connected to the sensor I/O 231 may be mounted on and electrical integrated with the electronic controller 200 or mounted externally within the insect trapping device 10 and may provide a digital or analog reading signal which may converted to a digital input value, detecting a measurable change in an attribute voltage and/or current of the supply of power signal to the electrode power supply 222 and duration of the change, arising from the electrocution event of a target insect, and an associating the change with one or more stored values in the programmed code stored in the non-volatile memory 206 representing the attribute and or duration in order to identify and disregard an initial, false discharge or signal attribute anomaly or to identify the target insect. A signal or lack of it from the current sensor 235 is monitored by the processor 201 which records the event values with a timestamp in the non-volatile memory 206, increments the digital bug kill counter 262 value on the programmable annunciator interface 260 and if there is connectivity transmits an alert to the data collection and control center 300 which in turn will transmit an alert to the user regarding the current status change.

d) Ambient Temperature Sensor

The ambient temperature sensor(s) 236 may be electrically connected and in communication with the sensor I/O 231 and may be mounted on the electronic controller 200 and/or mounted externally within the insect trapping device 10 to provide a digital or analog reading signal which may converted to a digital input value, detecting the ambient temperature within the control compartment and/or the external area in close proximity to the device 10. The signal from the ambient temperature sensor(s) 236 is monitored by the processor 201 which records the value at a specified programed timed interval with a timestamp to the non-volatile memory 206 as historical event and if there is connectivity transmits the values to the data collection and control center 300 which in turn will transmit an alert to the user regarding the current status change.

e) Humidity Sensor

The humidity sensor 237 if provided may be electrically connected and in communication with the sensor I/O 231 and may be mounted on the electronic controller 200 and/or mounted externally within the device 10 to provide a digital or analog reading signal which may converted to a digital input value, detecting the ambient humidity in close proximity to the device 10. The signal from the ambient humidity sensor(s) 237 is monitored by the processor 201 which records the value at a specified programed timed interval with a timestamp to the non-volatile memory 206 as historical event and if there is connectivity transmits the values to the data collection and control center 300 which in turn will transmit an alert to the user regarding the current status change.

f) Tilt/Motion Sensor

The tilt/motion sensor 238 if provided may be mounted on and electrical integrated with the electronic controller 200 and be in communication with the sensor I/O 231, and may contain a tilt and/or motion detection capability which may provide a digital or analog signal that may converted to a digital input value, to detect any irregular angle of operation other than vertically upright position, as in case the being tipped over and or movement of the insect trapping device 10. If it is detected that the device 10 has been knocked over or is not in the correct vertical orientation while the power is still connected, for safe operation the processor 201 can immediately override any programed settings and insure that power if present is disconnected to the electrode control relay 221 which controls the electrode power supply 22 thus disconnecting high voltage electrical power supplied the electrodes 223, the CO2 cycle relay 224 disconnecting power to the CO2 electric solenoid 225 thus closing the valve and shutting off the supply of carbon dioxide, and the heat source power module 226 which disconnects the power supplied to the heat source 227. Thus, the deactivated state insures that power to the electrodes 223, heat source 227 are and the CO2 electric solenoid 225 is prohibited and if power is still connected or delivered by means of a battery backup to the processor 201 may record the event values with a timestamp to the non-volatile memory 206, and if there is connectivity transmit an alert to the data collection and control center 300 which in turn will transmit to the registered user device application(s) 332, 336, and/or 365 regarding the current status alert. Once or until the device 10 has returned to the proper operating position the system will remain in a locked-out setting, until the power on/off switch 263 on the programmable annunciate interface 260 is manually reset.

In some example embodiments, a device 10 may report to the user 331, 361, 362 and/or dada collection and control center 300 device reporting database 308, live data collected from the device, that a visual inspection, servicing and cleaning is required.

In some example embodiments, a separate device application 332, 365, 366 may allow a user 331, 361, 362 from their computer, laptop, device or cell phone: to remotely program the device 10, identify and locate each device 10, be alerted to and have access to current and historical data collected such as the number of bugs killed, current mode of operation, status of consumables with predicted and required inspection and servicing, requests for firmware or programing updating.

In some example embodiments, service input sensors 84 may include one or more of: heat source temperature sensor 232, safety limits such as electrode interlock switch 230 and access cover interlock switch 229, current sensor 235, tilt/motion sensor 238, and CO2 pressure sensor 233.

In some example embodiments, local environmental sensors collecting location specific data where the device 10 is located may include one or more of: ambient temperature sensor 236, humidity sensor 237, and through the Satellite/GPS module 245 altitude, location, and/or through the communication module 241 integrated Wi-Fi connectivity location triangulation using local router, local internet conductivity.

In some example embodiments, the at least one processor 201, at least one processor local to the device or in communication therewith, and/or at least one control circuit computer chip represented by computer/smart device 364 may be programmable.

In some example embodiments, the programmed operation mode may allow adjustable time-controlled operation of the device 10 and/or the components within the device 10 to be set and/or adjusted either manually and/or through automated operation controlled by at least one processor, at least one processor local to the device or in communication therewith, and/or at least one control circuit computer chip.

In some example embodiments, the electronic controller 200 control circuit may stand alone or but is not restricted to communicate through a physical or wireless network or satellite connection to a central data collection and control center 300.

In some example embodiments, the electronic controller 200 control circuit may communicate with a user 331, 361, 362 using their computer/smart device 364 at a remote location through a physical or wireless network connection.

In some example embodiments, the control circuit may communicate with a user 331, 361, and 362 using their computer/smart device 364 at a remote location through a remote data collection and control center 300 through a physical and/or wireless and/or satellite network connection.

In some example embodiments, the electronic controller 200 control circuit and programmable firmware may be designed to facilitate control, intelligent operating adjustments to location activity, such as reducing operation cycles, discharge timing of the CO2 for maximum efficiency and results, remote reporting with a timestamp the unit connectivity, operating activity, required servicing information and allow remote and local firmware programming.

In some example embodiments, the electronic controller 200 control programming may support cluster-intelligence, with multi-unit local data acquisition and remote reporting capacity. Cluster-intelligence programing and integration of a number of separate devices 10 permits the potential to allow devices 10 to act independently and collectively to monitor and operate for the protection of a local/remote facility 363 location proactively from new and/or defensively against existing and/or identified insect infestations. Reported activity may help identify new or reoccurring infestations within a remote/local facility 363 and even predict strategic deployment within the remote/local facility 363 of devices 10 or the requirement of physical intervention by facility maintenance personnel 362, personal or service technicians.

Referring to FIGS. 7, 12 and 23, in some example embodiments, an RFID reader module 250 and one or more connected RFID antenna(s) such as but not restricted to RFID cylinder antenna 251a and RFID pad antenna 251b may be incorporated or connected to the main electronic controller 200 control circuit board using an RF signal generator to transmit signals to RFID tag 252, 253, depicted as RFID radio frequency waves 255, a receiver/signal detector to receive signals from RFID tag 252, 253 and a microcontroller that controls and processes signals and data received from and to the RFID tag 252, 253, depicted as RFID radio frequency waves 255. It induces enough power to the RFID tag 252, 253 to allow synchronization of the tag clock with the real-time clock/calendar 203 and act as a carrier for the transmission of data to and returning from the RFID tag 252, 253. In some example embodiments, an RFID reader module 250 and one or more antenna(s) such as RFID cylinder antenna 251a, RFID pad antenna 251b and RFID tag(s) 252, 253 may utilize either or both inductive coupling (near-field coupling) as depicted in figures and/or far-field coupling method and configuration to facilitate the RFID technology. In some example embodiments, the RFID pad antenna 251b may be mounted within device 10 but remotely from the electronic controller 200 control circuit board and connected by RFID antenna leads 251c to the RFID reader module 250.

In some example embodiments, a device (identification) ID RFID tag 254 may be attached, mounted on or incorporated in the device 10 and may be passive with a transponder connected to an antenna that receives radio waves, a rectifier circuit that converts the energy using capacitors to supply communication and power to an external RFD reader. The purpose of the tag may include but is not limited to inventory control, shipment tracking, and theft prevention. The tag may be writeable, readable and retain but is not limited to: model, serial number, manufacturing facility, manufacturing date, point-of-purchase.

In some example embodiments, an RFD tag 252, 253 may be attached, mounted on or incorporated in to the cylinder 124 or pin valve 120. The RFD tag 252, 253 may be passive with a transponder connected to an antenna that receives radio waves, a rectifier circuit that converts the energy using capacitors to supply communication and power to the electronic controller 200, and non-volatile memory 206. Thus, the device will be able to collect/read the data stored in the RFID tag 252, 253 chip memory and write data to the chip, to determine but not restricted to cylinder 124 information: if installed, level of $CO_2$, cylinder ID number, manufacturing facility, Department of Transportation (DOT) specification, cylinder manufacturing date, cylinder capacity, $CO_2$ charging facility, $CO_2$ charge or recharge date(s).

Referring to FIGS. 7 and 23, in some example embodiments, an insect collection pad RFID tag 253 may be attached, mounted on or incorporated in to the insect collection pad 66. The insect collection pad RFID tag 253 may be passive with a transponder connected to an antenna that receives radio waves, a rectifier circuit that converts the energy using capacitors to supply communication and power to the electronic controller 200, and non-volatile memory 206. Thus, the device 10 will be able to collect/read the data stored in the insect collection pad RFID tag 253 chip memory and write data to the chip, to determine but not restricted to the insect collection pad 66 information: if installed, removed, length of time used, if previously used, pad Identification number, manufacturing facility, manufacturing date, expiry date, life expectancy, point of purchase, and installation date.

Referring to FIGS. 7 and 23, in some example embodiments may comprise a removable and replaceable insect collection pad 66 beneath the insect electrocution zone 36, within the insect collection zone 25c, which also may comprise an adhesive and/or an impregnated attractant odor composition, and/or impregnated odor scent and/or an insect collection pad RFID tag 253 or other method for identification.

Referring to FIGS. 7, 23 and 24, In some example embodiments, the insect collection pad 66 identification and information may be provided though an integrated, affixed or mounted circuit chip or other means such as an insect collection RFID tag 253, that can communicate to and from the electronic controller 200 control circuit processor 201 in the device 10.

Referring to FIGS. 12, 23 and 24, in some example embodiments, at least one processor 201 and/or at least one control circuit processor 201 in the device 10 or remote such as a computer/smart device 364 or for example the external RFID reader used in the manufacturing facility thereto may also transmit information to an integrated, affixed or mounted circuit chip or other means such as a radio frequency identification RFID tag, CO2 cylinder RFID tag 252 and insect collection pad RFID tag 253 which can store such information such as but not limited to: device 10: model, serial number, manufacturing facility, manufacturing date, point-of-purchase; cylinder 124: identification number, manufacturing facility, DOT, manufacturing date, capacity, charging facility, charge or recharge date(s); insect collection pad 66: identification number, manufacturing facility, manufacturing date, pad life expectancy, point-of-purchase.

In some example embodiments, the electronic controller 200 solid-state PCB hardware may have built-in or incorporated Wi-Fi, Ethernet, USB, RFID, LoRa, Bluetooth, ZigBee, SigFox, Z-Wave, Symphony Link, NB-IoT, LTE-M, and other wireless technologies, Satellite, GPS communication capability and programmable firmware which may be designed to facilitate control, storage of historical events and status recorded locally in non-volatile memory 206, for example with a timestamp but not restricted to local event(s) reporting, intelligent operating adjustments to location activity, such as reducing operation cycles, discharge timing of the CO2 for maximum efficiency and results, with local and/or remote reporting with a unique device IP, device connectivity, operating activity, current status, power interruptions and recovery, location, required servicing information and allow remote and local firmware programming.

In some example embodiments, a processor 201 may also permit cluster-intelligence, with multi-unit local data acquisition and remote reporting capacity. Cluster-intelligence programing and integration of a number of separate device(s) 10 the potential to allow device(s) 10 to act independently and collectively to monitor and operate for the protection of a local/remote facility 363 location from new and against existing or identified insect infestations. Reported activity may help identify new or reoccurring infestations within a facility and even predict strategic deployment within the facility or the requirement of physical intervention.

In some example embodiments, the electronic controller 200 printed control circuit board may contain the necessary components in order to facilitate operation of the device 10, sensing, recording and reporting including but not restricted to reset fuse 212, computer processor 201, real-time clock/calendar 203, voltage controller(s) in the power management module 213, voltage regulator(s) 214, rechargeable battery 204 (for retention of volatile data when power is disconnected for servicing), current sensor 235, tilt/motion sensor 238, temperature sensor 236, humidity sensor 237, relays resistors, capacitors, led(s), and/or terminals for: power, sensors, interlocks, electrical components, pressure, and within or external to the communication module 241 and satellite/GPS module ethernet, USB, Wi-Fi, Blue-tooth, microwave, satellite with transmitter(s)/receiver(s) and antenna(s), and within or external to RFID reader module 250 an RFID reader with transmitter, receiver, antenna(s).

Referring to FIGS. 1 and 23, in some example embodiments, the electronic controller 200 printed control circuit board may be connected electrically, mechanically or both to external components within the device 10 including but not restricted to the CO2 cylinder RFID tag 252, insect collection pad RFID tag 253, CO2 electric solenoid 225, CO2 pressure sensor 233, heat source 227, ambient temperature sensor(s) 236, humidity sensor 237, tilt/motion sensor 238, access cover interlock switch 229, electrode interlock switch 230, high voltage electrode power supply 222, electrodes 223, and supply power cord 17, clock solar charger 205, and a power/battery supply 211 which may be internal or external to the device 10.

Referring to FIG. 24, in some example embodiments, a remote data collection and control center 300 may provide automated intelligent monitoring, reporting, management, programing, and data collection of each remote device 10 with connectivity enabled including but not restricted to device identification, device and peripheral status, time-stamped historical data and activity retained locally including those captured during periods of non-conductivity, alerts, service information, location, ownership registration, ambient conditions, firmware version identification, and transmission of firmware updates.

While exemplary embodiments herein may be useful for trapping, data collection, and/or data reporting of insects generally, the focus below is on bed bugs in particular.

Thus referring to FIGS. 1, 7, 9 and 17 to 20, in some example embodiments, two or more electrodes may be configured in the device 10 to form a vertically oriented profile as in FIGS. 17 to 20 depicted and for example identified as the outer and the inner electrode structures 40, 42 with a minimum spacing zone "S" between them as identified in FIG. 7 over as shown in FIG. 21 the lateral length 21A), partially angular arch 21C), 21D), or 360 degree angular perimeter 21B) of the electrodes, predetermined by the level of direct current voltage applied, which may provide one or more of the following advantages, and further features:

(a) as depicted in FIG. 17, the distance measured horizontally between the two vertical electrodes may vary to provide a candidate insect, such as a bed bug, of various sizes throughout their stages of development may be accommodated for electrocution, (b) referring to FIG. 7, gravity may be used to allow the insects to fall vertically from the outer boundary surface region 26, through the electrocution zone 36 between the two opposed outer and inner electrode surface regions 30, 32, to the lower insect delivery zone 25b and insect collection zone 25c, (c) opposing polished, coated, plating, or surface finish by other means traction-inhibiting, traction-reducing, or low friction outer and inner electrode surface regions 30, 32 may be configured to facilitate an insect's fall into the insect entry zone 25b and vertically through the electrocution zone 36, and reduce their ability to climb back out before reaching the optimum point of fall through the outer and inner electrode structures 40, 42 at which point electrocution occurs, through the insect delivery zone 25b and to the insect collection zone 25c below, (d) at the top of the inner passageway structure 20 the annular horizontal cross section distance between the outer boundary surface region 26 and the inner boundary surface region 24 and/or the opposing outer and inner electrode surface regions 30, 32 may help reduce (if not prevent) the migration of the insect from one electrode to the other without falling between and, may reduce the ability of the insects to sense any electromagnetic field that is more predominant between the electrically charged electrodes above the electrocution zone 36, (e) referring to FIGS. 5 and 6, the outer body anchor structure 72 may form part of the insect entry zone 25a over lapping the top of the outer and inner electrode structures 40, 42 and be included as or as part of the insect entry zone 25a with a transition region 58 from the outer entry traction-enabling to the outer boundary traction-inhibiting surface regions 56, 26, (f) cleaning and inspection may be facilitated by the removal and replacement of one or both outer and inner electrode structures 40, 42, (g) referring to FIG. 8, electrical-mechanical power connection and reconnection to outer and inner electrode structures 40, 42 may be facilitated while servicing or removing for cleaning or inspection, in some cases without the need for physical detachment and/or reattachment of electrical positive and negative leads 34a, 34b to the electrical fasteners 70b and 70c, (h) referring to FIGS. 9 and 6, vertical alignment and spacing between the opposing outer and inner electrode structures 40, 42, may be provided through thermal isolation and dissipation of heat generated by an electrical discharge between the girds at the point of impingement from the supporting outer and inner body structures 48, 50 and casing outer and inner body anchor structures 72, 70 may be achieved by means of spacing, material selection, thermal insulation, thermal dispersion, or other means, (i) referring to FIGS. 6 and 17, the distance between the outer and inner electrode structures 40,42 may be altered vertically or horizontally such that the top (or upper region) is greater than the bottom (or lower) insect delivery zone 25b, it may be angular, and may or may not be a mirror image, and the insect delivery zone 25b may terminate sharply at a 90 degree angle or be curved, (j) referring to FIG. 22, the extended lateral pattern profile between the outer and inner electrode structures 40, 42 may vary from the top downward sloping ridge to the bottom insect delivery zone 25b. As shown the pattern may be straight 22A), or from the top a relatively straight or even angular edge to a progressive and evenly spaced corrugated inside opposing face, resembling teeth, flutes or vertical ridges, to the bottom insect delivery zone 25b power to the electrodes 223, CO2 electrical solenoid 255 and heat source 227, when the inner body anchor structure 70 assembly which includes the inner electrode structure 42 and the inner body structure 50 is removed from the outer body structure 48, while the device 240 is being serviced or should the user forget to replace the inner body anchor structure 70 after inspection or cleaning;

(n) referring to FIGS. 1, 6, 7, 11 and 23, an access cover magnet 229b may be recessed in the access cover 13, whose magnetic field may be used to close a reed sensing access cover interlock switch 299, electrically connected in series with the electrode interlock switch 230, and mounted adjacent inside the housing 10 is used complete the electrical safety circuit when in the mounted position and open the electrical safety circuit to the safety interlock relay 228 when removed, thus supplying or disconnecting the power to the: electrode control relay 221 that controls the supply of electrical power to the electrode power supply 222 which in turn delivers the high voltage power to the electrodes 223; CO2 cycle relay 224 that controls the supply of electrical power to CO2 electrical solenoid 255 that controls the supply flow of CO2; and the heat source power module 226 that supplies electrical power to the heat source 227; thus effectively disconnecting power to the electrodes 223, CO2 electrical solenoid 255 and heat source 227, while the device 10 being serviced or should the user forget to replace the access cover 13 after inspection or cleaning;

(o) referring to FIGS. 5 and 6, in some configurations, the housing 12 may act as a secondary void above to help reduce absorption and disruption by ambient air currents, below the housing bulkhead 12a, of the CO2 above and extending below the insect entry summit region 19, which contributes significantly to maintain a carbon dioxide saturated oxygen depleted environment in the primary insect collection zone 25c used to incapacitate and kill the insects;

(p) referring to FIG. 1, in some configurations, a protective exterior housing 12 may minimize disruption of the ambient air in a room or location of the device 10, thus assisting the insects to identify, locate and signal the location of the device 10 to other insects;

(q) referring to FIG. 7, some configurations may reduce a purge time required to achieve and maintain an oxygen depleted environment within the insect collection zone 25c;

(r) referring to FIGS. 6, 7, and 9, in some configurations, insects may be rendered unconscious once they pass the insect entry summit region 19 into the oxygen depleted environment within the inner passage structure 20 inside the outer body anchor structure 72, automatically causing them to fall under the force of gravity through the electrified inner and outer electrode surface regions 30, 32 and be kill through electrocution in the electrocution zone 36 and/or to the bottom of the insect collection zone 25c where they may or may not be entrapped upon contact of an insect collection pad 66 with an exposed adhesive side;

(s) referring to FIGS. 1, 5, 6, 7, 11, and 16, some configurations may incorporate colors on surfaces outside and inside the device 10, and component elements (such as but not restricted to the replaceable insect collection pad 66) to attract or repel bed bugs based on sex and age along the insect path 28 toward the insect collection zone 25c, including but not restricted to the outer entry surface region 56, outer boundary surface region 26, inner passageway 22, inner boundary surface region 24, inner and outer electrode surface regions 30, 32, the insect collection zone 25c, and away from the interior surfaces and/or lining for the upper housing region 14, housing skirt structure 76, housing bulkhead 12a, column support structures 78, and externally away from the upper housing 14, access cover 13, and allow for visual identification against such surfaces;

(t) referring to FIGS. 1 and 7, in some configurations, various combinations control discharge and mixing of CO2 and odor within the insect collection zone 25c beneath the minimum spacing zone S, which acts as a restriction to the flow of CO2, regulate escapement of CO2 and odor evenly and with effective perimeter coverage around the device 10 access opening 18;

(u) referring to FIGS. 1 and 6, in some configurations, the perimeter radius, length or combined length of the outer entry surface region 56 may provide a greater efficiency to attract insects when: i) they approach from random locations around the device 10, ii) ambient room conditions disrupt or alter the flow direction of the carbon dioxide from the device 10; and (v) referring to FIGS. 6 and 9, in some configurations, the interior depth between the insect entry summit region 19 and the outer annular bottom surface 62, and volume of the inner passage structure 20 within the outer body anchor structure 72, less the displacement volume of the inner body anchor structure 70, affects the time required to create an oxygen depleted environment and reduce of the effects caused by absorption, and disbursement of CO2, may help maintain a functional level of CO2 to provide effective means for asphyxiation in addition to and beyond being just an attractant.

Some example embodiments may provide non-conductive electrical isolation mounting and vertical and horizontal alignment of the inner and outer electrodes and ensures a fixed distance between them when assembled during manufacturing, operation, and while conducting servicing.

In some example embodiments, the removal of the inner body anchor structure may facilitate visual inspection and cleaning of insect collection zone and inner and outer electrode surface regions, and replacement of the insect collection pad, and ensuring that the insect collection pad is held in the correct position during operation safely positioned below the electrodes to prevent premature and uncontrolled electrical discharge, and in an optimized position to capture insects falling through electrodes.

In some example embodiments, the inner body anchor structure may be configured to assist with the withdrawal and installation of the insect collection pad providing minimal physical contact to either the collected bugs or, if included, chemical attractant or scent that may be impregnated in the pad.

In some example embodiments, the lower insect collection zone may provide an additional area of entrapment and kill through asphyxiation, along with a number of other functions. The pressurized compartment area may minimize the effects of surrounding ambient air movement (windows, ventilation, etc.) and from dispelling the concentration of CO2, thus ensuring the suffocation of entrapped bed bugs.

Some example embodiments may provide a monitor and control system that will attract, entrap, and kill bed bugs in a single device or a combination of associated components thereof, that may reduce by elimination high percentages of any population of bed bugs. In some instances or applications, infestation may be continuous and reoccurring problem, in part caused by migrating of bed bug populations, insecticide resistance, and reintroduction through various means including human travel, often making exposure and re-infestation inevitable.

In relation to some exemplary embodiments, bed bugs require oxygen to sustain life. To create an oxygen depleted environment that would ensure asphyxiation the design utilizes the volume within the sealed construction of the inner passageway comprised of the outer body structure, outer electrode structure and outer boundary surface region and the relative density of $CO_2$ (1.5189) to air (Oxygen=1.1044, Nitrogen=0.9668). As the relatively heavier $CO_2$ molecule is discharged in to lower bowl-shaped vessel compartment chamber below the insect delivery zone, any oxygen molecule and other lighter gas molecules in the chamber are displaced upwards thus providing an oxygen depleted environment within the insect collection zone. When the $CO_2$ fills the vessel chamber past the minimum spacing zone and into the upper space between the inner and outer electrocution surface regions male and female bed bugs of all stages of development are rendered unconscious. The oxygen depleted environment may thus assist in capture and kill effectiveness.

Referring to FIG. 24, provides a functional schematic diagram of the data collection and control center 300 in communication with remote device(s) 10 that controls, monitors and provides a data collection, storage and reporting system.

Consumer Location

The consumer location 330, may typically be but is not restricted to a single occupied or unoccupied residential home, apartment, condominium, office or other location where one or more device(s) 10 are located.

User

The user 331 generally refers to one or more individuals who own or operate the device(s) 10 which is usually but is not restricted to one physical location such as single or multi roomed occupied or unoccupied residential home, apartment, condominium, cottage, dorm, office waiting room or other location.

Device Application

Figure 14:
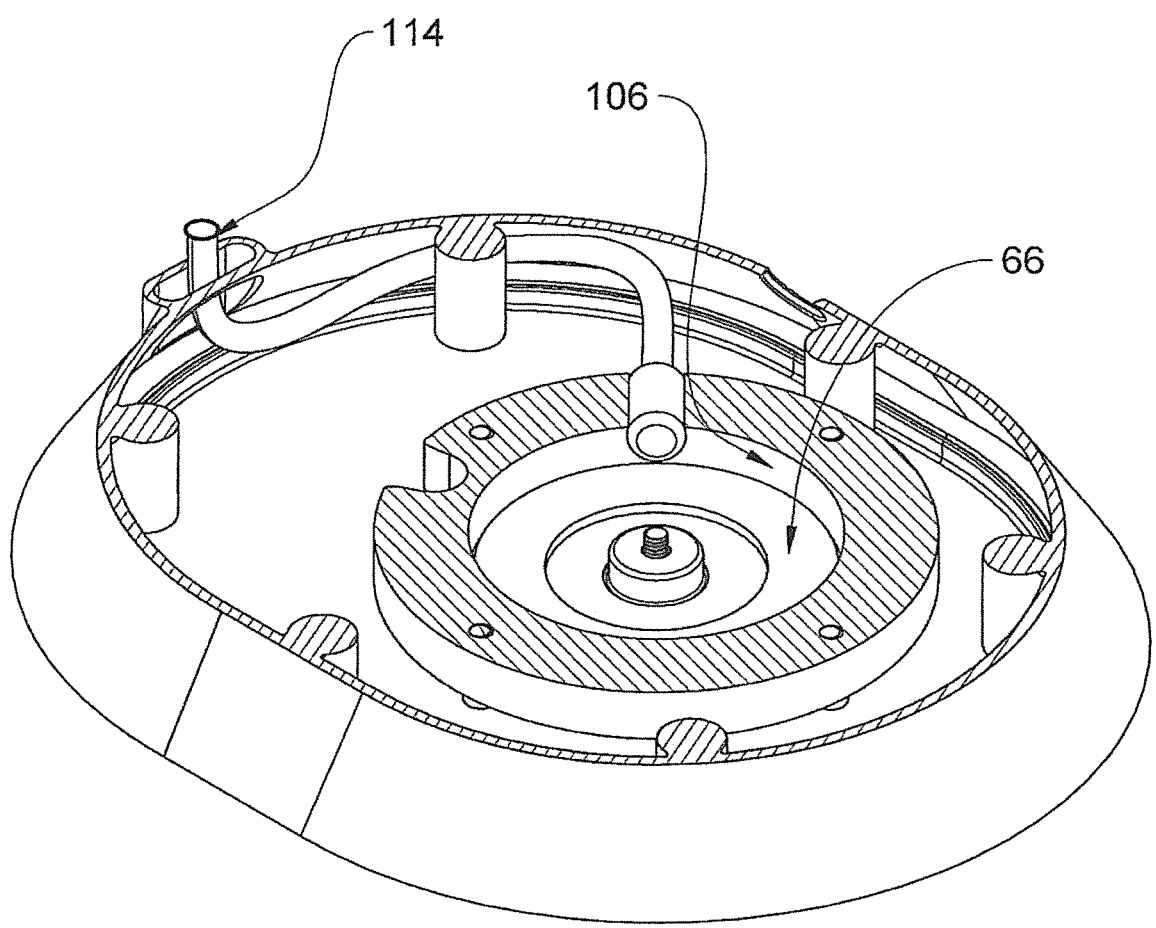
FIG. 14 is a perspective sectional view take on line 14-14 of FIG. 3B) plan view.

The device application 332, 366 may be configured to allow the device 10 to operate independently and/or under the management of a user 331 and/or in conjunction and in communication with a remote data collection and control center 300. The user 331 and/or facility maintenance management 361 and/or facility maintenance personnel 361, may be able to adjust program settings and configuration of the device 10 manually through the device's annunciator interface or by use of but not limited to a smart device 10 through a pre-programmed device specific or cross-platform device application 332, 336. Communication between the operator and device 10 may be facilitated by a direct link 368 and/or but not restricted to Wi-Fi, Bluetooth, Ethernet, USB, phoneline connection and/or satellite 247. The consumer device application 332 and/or the commercial device application 366 and/or the facility application 365 may also facilitate tracking of inventory levels and online ordering of parts, devices 10, consumables such items but not restricted to $CO_2$ cylinder(s) 124 as shown in FIG. 12 and insect collection pads 66 as shown in FIG. 14.

Commercial Location

The commercial location 360, may typically be but is not restricted to a multi occupied or unoccupied commercial facility or facilities such as but not restricted to an: office, hotel, motel, hospitals, medical and long-term care facilities, multi-unit apartments and condominiums, or cruse ships, where one or more device(s) 10 are located, under direct or indirect supervision which may include but is not limited to facility maintenance management 361, facility maintenance personnel 361, such as building services, security management, and/or pest management for a local/remote facility 363 relative physical location.

At the commercial location 360 data transmitted from deployed device(s) 10 from one or more facilities is automatically and directly transmitted to the data collection and control center 300 which stores and retransmits the data to the facility maintenance management 361 and/or facility maintenance personnel 362 who are registered in the customer database 307 and responsible for administration, servicing and management for the reporting device(s) 10.

The commercial location 360 may also provide and incorporate a number of additional features and functions within device 10 programming, and/or the facility application 365, and/or device application 366 such as cluster-intelligence programming, previously described and in addition to those included for a consumer location 330 designed, for administration by facility maintenance management 361, facility maintenance personal 362 alerts and scheduling, service reporting, security, activity reporting, service alerts, historical activity data, from single, multipole and/or or location and/or client specific deployment of device(s) 10.

Data Collection and Control Center

The data collection and control center 300 may but is not limited to provide customer registration, validation, communication, device 10 registration, device 10 programming and upgrade deployment, device application 332, 366 deployment, facility application 365 deployment, remote control of device(s) 10, collection and storage of data received and transmitted to, single or multiple device(s) 10 registered or unregistered, both actively reporting or non-reporting, that are deployed and retransmission of reported data to the user 331, facility maintenance management 361 and facility maintenance personnel 362 who are registered in the customer database 307 and responsible for ownership, administration, servicing and/or management of the reporting device(s) 10.

The data collection and control center 300, may communicate, monitor, remotely control, adjust and/or override preprogrammed settings, retrieve, store and report historical data stored from the device 10, and alert user 331, facility maintenance management 361 and facility maintenance personnel 362 with a timestamp current status and historical data such as but not limited to the device status, physical location information, communication connectivity hi story and problems, malfunction, theft, insect activity, the number of insects killed, and servicing needs such as but not limed to inspection, cleaning, replacement of consumables.

The data collection and control center 300 may receive and transmit data and/or information through a local network attached to a local network router(s) 244 to facilitate connectivity by means of one or more methods but not limited to fiberoptic, cable, DSL, microwave, dial-up with the internet cloud and/or satellite. The data collection and control center 300 may be located in one or more physical locations and provide support to customers in one or more languages support.

The data collection and control center 300 may contain several computer servers and/or virtual servers related to specific data and organizational functions, such as but not limited to a:

a) local router(s) 301 may provide but is not restricted to receive signals from multiple incoming and outgoing ports, provide load balancing, incoming signal identification, firewall, virus scanning and defence, monitor network device(s), restrict access to certain servers, handle and translate data encryption, handle digital certification identification requests, communication redirection to the appropriate server, provide connectivity between the internet and/or other external communication channels to the local network within the data collection and control center 300.

b) communication server(s) 302 may receive, identify and verify identity through a query request to the customer database 307, store, handle and/or redirect communication requests and responses such as but not restricted to email, text, faxes and telephone from user 331, facility maintenance management 361, facility maintenance personnel 362 to the customer support CPU 309 and facilitate voice and digital data communication.

c) device ID server(s) 303 may but is not restricted to; receive a request and verify identity including serial number, manufacturing information, sales channel, purchase date, ownership, and location of the device 10, and consumables such as but not restricted to identification of cylinder(s) 124 as shown in FIG. 12 and insect collection pads 66 as shown in FIG. 14, through a query to the customer database 307 and device reporting database 308.

d) application server(s) 304 may handle requests for device application 332, 366 and facility application 365 downloads, updates and deployment.

e) device reporting server(s) 305 may handle all incoming data received from device(s) 10 such as but not limited to verify the device identification through a request to the device ID server 303, RFID tag data and sending the incoming data to the device reporting database 308 for storage.

f) notification server(s) 306 may handle all outgoing notifications and reporting data to consumer device application(s) 332, and/or facility application(s) 365, and/or commercial device application(s) 366 regarding any or all device(s) 10 specifically registered under the customers ownership and control and identified and validated through a query to the customer database 307.

The data collection and control center 300 may contain several database servers that provide storage and retrieval of specific data such as but not limited to a:

a) secured customer database 307 which may receive, store, backup and maintain an achieve of active and historical customer data, encrypted passwords, RFID tag data, and receive and reply to database queries from other specified and validated servers within the data collection and control center 300 network.

b) reporting database 308 which is physically separate from customer database 307 which may receive, store, backup and maintain an achieve of active and historical data from device 10 identified with a unique identification number, and receive and reply to database queries from other specified and validated servers within the data collection and control center 300 network.

The data collection and control center 300 may contain one or more computer workstations to provide administrative monitoring, control of deployed device(s) 10, and communication received, within and originating from the data collection and control center 300 whose function is related to but no restricted to a:

a) customer support CPU 309, related to but not restricted to providing support to registered customers, device 10 installation support, registration, software application licensing, renewals, and invoicing, customer information changes, location services in case of theft of device(s) 10, and general inquires related to the data collection and control center 300 operations.

b) monitoring CPU 310, related to but not restricted to monitoring of deployed device 10 status, location, operational activity and inactivity, connectivity issues and alerts.

c) application support CPU 311, related to but not restricted to device application 332 support, cluster-intelligence programming support, installation, uploading, upgrading, configuration, trouble shooting, and general questions and education.

d) data collection CPU 312, related to but not restricted to overseeing collection of data received from deployed device(s) 10, customer data, and the secured storage and backup of such data on the customer database 307 and device reporting database 308 server(s).

e) data reporting CPU 313, related to but not restricted to monitor and support data reporting transmitted from the device(s) 10 is relayed in real-time and upon special request to active device application(s) 332 or facility application(s) 365 within the scope of application agreements, that maybe licensed.

f) monitor(s) 314 may be attached to each workstation and/or the network to provide visual display of data from the workstation or received form networked servers.

g) keyboard/mouse 315 may be attached to each server and workstation to facilitate input to the server and/or workstation.

h) local and or networked printer(s) 316 may provide hardcopy printouts of communication information, accounting reports, requests, device(s) 10 reports, customer reports and data collection and control center 300 operations administration monitoring and reporting.

Pesticide Resistance

Pesticides are the number one method used kill bed bugs. Cross-resistance is quickly rendering all pesticides ineffective at alarming rate across North America and Europe according to recent scientific reports. Additional reports have confirmed that this cross-resistance is being passed on to the next generation. The use of pesticides presents both a harmful health and environmental impact. Example embodiments herein described may thus provide alternative and effective means to kill bed bugs without the use of pesticides.

Chagas Disease

Bi-transmission and spread of the debilitating and potentially deadly Chagas Disease by bed bugs and rodents has been confirmed. This is the highest impact infectious disease in Latin America and it is spreading at an alarming rate across the United States. Bed bugs are now the second greatest vector for transmission of this disease while blood-feeding on humans and animals, thus silently spreading the parasite from one victim to another. Easily undetected for years, each victim becomes a host, unknowingly spreading the irreversible disease to others. After the initial infection, if not treated, the host will be a carrier for life. Example embodiments herein described may thus provide active local vector monitoring system that can potentially be used to provide local and remote monitoring of this vector of disease and reduce potential exposure to this disease.

Low Friction

Many bed bug traps in the market rely on the ability to retain bugs once they fall or enter a trap by utilizing low-friction surfaces. A research team led by Dae-Yun Kim at the Universiti Sains Malaysia, has observed and published a study that explains why the tropical bed bug (*Cimex hemipterus*) can readily climb out of smooth-walled pitfall traps. Utilizing electron microscope images, they found that the number and greater density of hairs on the hind-leg tibial pad of *C. hemipterus* enables it to scale smooth walls of common pitfall traps. Example embodiments herein described may not rely on retention of live bed bugs as the only means to trap them. Inherently, when in operation as intended example embodiments herein described may trap and then kill the insects before they can escape by scaling low-friction surfaces within.

Clauses

Thus, exemplary embodiments may be provided by any one or more of the following clauses. The present disclosure explicitly provides basis for any limitation of any one clause to be claimed on its own, or in combination with any one or more limitations of any other clause hereinbelow:

1. An insect trapping device comprising an inner passageway structure defining an inner passageway which, when in an upright orientation, extends from an insect entry zone to an insect delivery zone, the inner passageway structure bordered by at least a pair of opposed insect-facing traction-reducing boundary surface regions to cause an insect to progress toward the insect delivery zone under gravity, with each boundary surface region including at least one of at least a pair of electrode surface regions, wherein each electrode surface region is configured for operative coupling with an electrode power supply to deliver electrical power thereto, the electrode surface regions configured to form an electrocution zone therebetween, with a designated spacing which is configured to initiate electrocution of an instance of the insect descending through the electrocution zone.

2. An insect trapping device comprising an inner passageway structure defining an inner passageway which, when in an upright orientation, extends from an insect entry zone to an insect delivery zone, the inner passageway structure bordered by at least a pair of opposed boundary surface regions to cause an insect to progress toward the insect delivery zone under gravity, with each boundary surface region including at least one of at least a pair of electrode surface regions, wherein each electrode surface region is configured for operative coupling with an electrode power supply to deliver electrical power thereto, the electrode surface regions configured to form an electrocution zone therebetween, with a designated spacing which is configured to initiate electrocution of an instance of the insect descending through the electrocution zone.

3. A device as defined in any preceding or following clause, wherein the designated spacing is within a size distribution of a designated population of the insect.

4. A device as defined in any preceding or following clause, further comprising the electrode power supply.

5. A device as defined in any preceding or following clause, wherein the electrode power supply is configured to deliver sufficient power to the electrode surface regions to generate an electrical discharge, according to the designated spacing.

6. A device as defined in any preceding or following clause, wherein the electrical power supply is configured to generate an electrical potential between the opposed electrode surface regions sufficient to discharge therebetween and through the insect, with or without the insect contacting one or more electrode surface regions.

7. A device as defined in any preceding or following clause, wherein the inner passageway structure further comprises a first electrode structure defining a first electrode surface region and a second electrode structure defining a second electrode surface region.

8. A device as defined in any preceding or following clause, wherein the first and second electrode structures define continuous or discontinuous instances of the first and second electrode surface regions respectively.

9. A device as defined in any preceding or following clause, wherein the boundary surface regions are nested to form the inner passageway with an annular cross section, at least in part.

10. A device as defined in any preceding or following clause, wherein the inner passageway defines a minimum spacing zone which is included in, adjacent to, or downstream of the electrocution zone, wherein one or more of the boundary surface regions are configured to progressively reduce a lateral spacing of the annular cross section toward the minimum spacing zone.

11. A device as defined in any preceding or following clause, wherein the boundary surface regions are formed as inner and outer cones, at least in part.

12. A device as defined in any preceding or following clause wherein the inner passageway structure includes nested inner and outer body structures, with the first and second electrode surface regions formed respectively thereon.

13. A device as defined in any preceding or following clause, wherein the inner body structure is removable relative to the outer body structure.

14. A device as defined in any preceding or following clause, wherein the insect entry zone provides an outer entry surface region configured to provide a travel path for the insect, and a transition region between the outer entry surface region and adjacent a corresponding outer boundary surface region.

15. A device as defined in any preceding or following clause, wherein the insect entry zone provides an outer traction-enabling entry surface region configured to provide a travel path for the insect, and a transition region between the outer entry surface region and adjacent a corresponding traction-inhibiting outer boundary surface region.

16. A device as defined in any preceding or following clause, wherein the outer body structure includes a base structure and an annular wall structure extending therefrom to define an annular bottom surface to be in communication with the insect delivery zone.

17. A device as define in any preceding or following clause, further comprising an inner body support structure centrally located relative to the base structure and extending therefrom, the inner body support structure configured to support the inner body structure so as to be substantially aligned with aligned with the annular bottom surface.

18. A device as defined in any preceding or following clause, wherein the inner body structure includes a mounting passage to receive the inner body support structure therein, the inner body structure configured to receive the first electrode structure thereon in an aligned position relative to the annular bottom surface according to a central axis of the inner body support structure.

19. A device as defined in any preceding or following clause, further comprising an inner body anchor structure which is configured to be aligned with the inner body structure to receive the first electrode structure therebetween, and removably securable relative to the inner body support structure.

20. A device as defined in any preceding or following clause, wherein the outer annular wall structure is configured to receive the second electrode structure thereon.

21. A device as defined in any preceding or following clause, wherein the outer annular wall structure and the second electrode structure are configured to be aligned with the outer annular bottom surface according to the central axis of the inner body support structure.

22. A device as defined in any preceding or following clause, further comprising an outer body anchor structure which is configured to be aligned and securable relative to the outer annular wall structure to receive the second electrode structure therebetween.

23. A device as defined in any preceding or following clause, further comprising a housing having an upper region and a lower region, the lower region including a skirt structure bordering an access opening, and wherein the outer body anchor structure defines the outer entry surface region adjacent the access opening and opposite the skirt structure.

24. A device as defined in any preceding or following clause, further comprising a plurality of column support structures extending between the outer body anchor structure and the housing and through the insect entry zone.

25. A device as defined in any preceding or following clause, further comprising an insect collection zone in communication with the insect delivery zone.

26. A device as defined in any preceding or following clause, further comprises a heat source positioned adjacent the insect entry zone.

27. A device as defined in any preceding or following clause, further comprising a continuous or intermittent source of CO2 supplied beneath the insect electrocution zone.

28. A device as defined in any preceding or following clause, further comprising a removable and replaceable source of odor beneath and/or adjacent the insect electrocution zone.

29. A device as defined in any preceding claim, further comprising a removable and replaceable insect collection pad beneath the insect electrocution zone, within the insect collection zone.

30. An insect collection pad in any preceding or following clause, further comprising an adhesive, for attachment to a corresponding surface.

31. An insect collection pad as defined in any preceding claim, further comprising an impregnated attractant odor composition.

32. An insect collection pad in any preceding or following clause, further comprising an impregnated odor scent.

33. An insect trapping device comprising an elongate chamber extending from an entry to an exit to form a passageway therebetween, the chamber having one or more peripheral surface regions configured to guide at least one instance of an insect of a population of insects under a force of gravity along the passageway when the chamber is oriented in an upright position, wherein the chamber provides, along the passageway, a pair of electrodes with a progressively reduced spacing therebetween from the entry and selected to place each of the instance of the population between both electrodes, wherein the electrodes are configured to receive power sufficient to electrocute the insects passing therebetween.

34. An insect trapping device comprising a chute extending from an entry zone to a delivery zone, the chute having one or more peripheral surfaces configured to guide at least one instance of an insect of a population of insects under a force of gravity along the chute when oriented in an upright position, wherein the chute is further configured to deliver the insect to a location to receive an electrocuting quantity of power, and thereafter to deliver the insect to the delivery zone.

35. An insect trapping device comprising a chute extending from an entry zone to a delivery zone, the chute having one or more peripheral traction-inhibiting surfaces configured to guide at least one instance of an insect of a population of insects under a force of gravity along the chute when oriented in an upright position, wherein the chute is further configured to deliver the insect to a location to receive an electrocuting quantity of power, and thereafter to deliver the insect to the delivery zone.

36. A device as defined in any preceding or following clause, wherein the surfaces are defined, at least in part, on a pair of electrodes which delivers the electrocuting quantity of power.

37. A device as defined in any preceding or following clause, wherein the traction-inhibiting surfaces are defined, at least in part, on a pair of electrodes which delivers the electrocuting quantity of power.

38. A device as defined in any preceding or following clause, wherein the surfaces are on opposite sides of the chute, and converge to a minimum spacing to accommodate a lower limit of a size distribution of the population.

39. A device as defined in any preceding or following clause, wherein the traction-inhibiting surfaces are on opposite sides of the chute, and converge to a minimum spacing to accommodate a lower limit of a size distribution of the population.

40. A device for trapping an insect, comprising a chute configured with an inlet to receive an insect, and to deliver the insect under a force of gravity to an outlet, a chamber configured to be in communication therewith at a transition below the outlet, at least one CO2 supply port in fluid communication with the chamber to deliver CO2 thereto, wherein the chamber is configured to contain the CO2 therein and to form a transitional atmospheric environment between a CO2 environment in the chamber and an atmospheric environment external to the inlet, so as to render unconscious and asphyxiate an insect in the chamber.

41. A device for trapping an insect, comprising a chute configured with an inlet to receive an insect, and to deliver the insect under a force of gravity to an outlet, a chamber configured to be in communication therewith below the outlet, at least one CO2 supply port in fluid communication with the chamber to deliver CO2 thereto, wherein the chamber is configured to contain the CO2 therein and to asphyxiate an insect in the chamber.
42. A device as defined in any preceding or following clause, further comprising a gas flow controller to establish the CO2 to the chamber at a molecular density sufficient to displace substantially all oxygen therefrom to form a substantially oxygen depleted environment therein.
43. A device as defined in any preceding or following clause, wherein the gas flow controller is configured to maintain the substantially oxygen depleted environment continuously and/or intermittently.
44. A device as defined in any preceding or following clause, wherein the at least one CO2 supply port is in fluid communication with a CO2 supply source, and a regulator structure for regulating a volume flow rate of CO2 to be delivered to the chamber.
45. A device as defined in any preceding or following clause, wherein the CO2 gas flow controller is a fitting to receive a cylinder containing compressed CO2.
46. A device for trapping an insect, comprising a housing having upper and lower housing portions, the lower housing portion having an insect-facing inclined surface extending upwardly from an exterior entry region toward an upper insect entry zone, the inclined surface configured to provide a travel path for the insect toward the entry zone, the upper housing portion operatively positioned above the inclined surface to define an opening therebetween to shield the inclined surface, at least in part, and a heat source configured to generate a wavelength recognizable to an insect approaching or traversing the inclined surface toward the entry zone.
47. A device as defined in any preceding or following clause, wherein the heat source is positioned on the upper housing portion and configured to be above the entry zone, wherein the entry zone is configured to be in communication a collection zone.
48. A device as defined in any preceding or following clause, wherein the upper housing portion is supported by at least one upwardly directed support between the upper and lower housing portions, and the support is configured with at least one surface to inhibit traverse of the insect along the support.
49. A device as defined in any preceding or following clause, wherein the upper housing portion is supported by at least one upwardly directed support between the upper and lower housing portions, and the support is configured with at least one insect-facing traction-inhibiting surface to inhibit traverse of the insect along the support.
50. A device as defined in any preceding or following clause, wherein the upper and lower housing portions are configured so that the inclined surface is planar or conical, at least in part, and the entry zone is planar or annular, at least in part.
51. An insect trapping device comprising a chute bordered by at least a pair of opposed surface regions, an electrocution zone in communication with the chute to receive insects therefrom under gravity, the chute configured with an opening with sufficient spacing to prevent an instance of an insert of a designated population of insects from traversing from one surface region to another to avoid the chute, the electrocution zone configured with a designated size and electrical power to initiate an electrocuting discharge to an instance of the insect travelling therethrough, and a delivery zone in communication with the electrocution zone to receive the insect following electrocution.
52. A device as defined in any preceding or following clause, further comprising an electrode power supply unit configured to deliver a supply of power to the chute, and a detector in communication with the electrode power supply unit to detect a change in an attribute of a supply of power arising from the electrocution of a target insect.
53. A device as defined in any preceding or following clause, further comprising at least one processor in communication with the detector to associate the change with one or more data signatures in memory to identify a target insect.
54. A device as defined in any preceding or following clause, wherein the detector or processor is configured to output a signal encoding a target insect identity value.
55. A device as defined in any preceding or following clause, wherein the output is selected from at least one of a display, an input to a computer system, and a signal transmitter.
56. An insect collection pad in any preceding or following clause, further comprising an integrated, affixed and/or mounted circuit chip or other means such as a radio frequency identification (RFID) tag.
57. A method of detecting an insect electrocution event, comprising providing an insect trapping device capable of killing an instance of a target of a population of insects by a measurable power signal; detecting a change in an attribute of power signal arising from the electrocution event of the target insect, and a associating the change with one or more stored values of data representing the attribute to identify the target insect.
58. A method as defined in any preceding or following clause, wherein the attribute is selected from at least one of a change in voltage, current, and a duration associated with the change.
59. A non-transitory computer readable medium having recorded thereon statements and instructions for execution by a processor on a remote device, said statements and instructions comprising:
   a. configuring an instructional input on the remote device to generate following user interaction therewith corresponding to one or more instructions for configuring an insect trapping device;
   b. receiving from the insect trapping device, one or more signals encoding a target insect identity; and
   c. storing the target insect identity in memory.
60. A non-transitory computer readable medium having recorded thereon statements and instructions for execution by a processor on a smart phone, said statements and instructions comprising:
   a. configuring a touch screen on the smart phone to generate touch screen data following user interaction with the touch screen corresponding to one or more instructions for configuring the device of claim any preceding claim;
   b. receiving from the insect trapping device, one or more signals encoding a target insect identity; and
   c. storing the target insect identity in memory.
61. An insect trapping device comprising confined passageway means which, when in an upright orientation, extends from an insect entry zone to an insect delivery zone, the confined passageway means bordered by at least one electrode means to form an electrocution zone therein, the at least one electrode means configured for operative coupling with power supply means to deliver electrical power thereto, wherein the confined passageway means and the least one electrode means cooperate in the electrocution zone to initiate electrocution of an instance of the insect descending therethrough.

62. A device as defined in any preceding or following clause, wherein the confined passageway means has a designated spacing according to a size distribution of a designated population of the insect.

63. A device as defined in any preceding or following clause, further comprising the power supply means.

64. A device as defined in any preceding or following clause, wherein the power supply means is configured to deliver sufficient power to the electrode means to generate an electrical discharge, according to the designated spacing.

65. A device as defined in any preceding or following clause, wherein the at least one electrode means includes a plurality of opposed electrode means.

66. A device as defined in any preceding or following clause, wherein the power supply means is configured to generate an electrical potential between the opposed electrode means sufficient to discharge therebetween and through the insect, with or without the insect contacting one or more of the electrode means.

67. A device as defined in any preceding or following clause, wherein the opposed electrode means are nested to form the confined passageway means with an annular cross section, at least in part.

68. A device as defined in any preceding or following clause, wherein the confined passageway defines a minimum spacing, wherein the opposed electrode means are configured to progressively reduce a lateral spacing of the annular cross section toward the minimum spacing.

69. A device as defined in any preceding or following clause, wherein the opposed electrode means are formed as inner and outer cones, at least in part.

70. A device as defined in any preceding or following clause, wherein an inner of the nested electrode means is removable relative to an outer of the electrode means.

71. An insect trapping device comprising an elongate chamber means extending from an entry to an exit to form a passageway means therebetween, the chamber means having one or more peripheral surface regions configured to guide at least one instance of an insect of a population of insects under a force of gravity along the passageway means when the chamber means is oriented in an upright position, wherein the chamber means provides, along the passageway means, at least a pair of spaced electrode means with a progressively reduced spacing therebetween, wherein the electrode means are configured to receive power sufficient to electrocute the insects passing therebetween.

72. An insect trapping device comprising chute means extending from an entry zone to a delivery zone, the chute means configured to guide at least one instance of an insect of a population of insects under a force of gravity along the chute means when oriented in an upright position, wherein the chute means is further configured to deliver the insect to a location to receive an electrocuting quantity of power, and thereafter to deliver the insect to the delivery zone.

73. A device for trapping an insect, comprising chute means configured with an inlet to receive an insect, and to deliver the insect under a force of gravity to an outlet, chamber means configured to be in communication with the chute means at the outlet thereof, at least one $CO_2$ supply means in fluid communication with the chamber means to deliver $CO_2$ thereto, wherein the chamber means is configured to contain the $CO_2$ therein to asphyxiate an insect therein.

74. A device as defined in any preceding or following clause, further comprising a gas flow control means to establish the $CO_2$ in the chamber means at a molecular density sufficient to displace substantially all oxygen therefrom to form a substantially oxygen depleted environment therein.

75. A device as defined in any preceding or following clause, wherein the gas flow control means is configured to maintain the substantially oxygen depleted environment continuously and/or intermittently.

76. A device as defined in any preceding or following clause, wherein the at least one $CO_2$ supply means is in fluid communication with a $CO_2$ supply source, and a regulator means for regulating a volume flow rate of $CO_2$ to be delivered to the chamber means.

While the present disclosure describes various example embodiments, the disclosure is not so limited. To the contrary, the disclosure is intended to cover various modifications and equivalent arrangements, as will be readily appreciated by the person of ordinary skill in the art.

What is claimed is:

1. An insect trapping device comprising:
a housing;
an insect entry zone that comprises an access opening defining a traction-enabling outer entry surface region along a base perimeter of the housing, wherein the outer entry surface region:
extends from the base perimeter of the housing and slopes up and inward into the housing; and
enables an insect outside the insect trapping device to travel into the housing;
a traction-enabling surface that continues sloping up and inward from the traction-enabling outer entry surface region to a summit region;
wherein the summit region transitions the traction-enabling surface to opposed insect-facing traction-reducing boundary surface regions to cause an insect to descend toward an insect delivery zone under gravity;
wherein the opposed insect-facing traction-reducing boundary surface regions comprise an inner boundary surface region nested within an outer boundary surface region to form an inner passageway with an annular cross section, at least one of the inner boundary surface region and the outer boundary surface region progressively reducing the annular cross section such that a minimum spacing zone is defined between the inner boundary surface region and the outer boundary surface region;
wherein the inner boundary surface region comprises an inner electrode structure having an inner electrode surface region, and the outer boundary surface region comprises an outer electrode structure having an outer electrode surface region such that the inner electrode structure and the outer electrode structure provide an opposing tapered or toroidal cone shape;
wherein the inner electrode surface region and the outer electrode surface region define opposing electrode surface regions and are configured for operative coupling with an electrode power supply to deliver electrical power thereto such that an electrical potential between the opposing electrode surface regions is sufficient to discharge between the opposing electrode surface regions by an insect traveling between them, with or without the insect having to touch either or both of the opposing electrode surface regions to form an electrocution zone therebetween that initiates electrocution of the insect when descending through the electrocution zone.

2. The device of claim 1, wherein the minimum spacing zone defines a designated spacing that is within a size distribution of a designated population of the insect sufficient for the insect to fall through the minimum spacing zone and into an insect collection zone there below.

3. The device of claim 1 further comprising:
the electrode power supply;
wherein:
the electrode power supply is configured to perform at least one of:
deliver sufficient power to the opposing electrode surface regions to generate an electrical discharge, according to a designated spacing; and
generate an electrical potential sufficient to discharge and electrocute different sizes of insect at different points between the opposed electrode surface regions.

4. The device of claim 1 further comprising an insect collection zone in communication with the insect delivery zone.

5. The device of claim 1 further comprising a heat source positioned adjacent the insect entry zone.

6. The device of claim 1 further comprising a continuous or intermittent source of $CO_2$ supplied beneath the electrocution zone.

7. The device of claim 1 further comprising a removable and replaceable source of odor beneath the electrocution zone.

8. The device of claim 1 further comprising a removable and replaceable insect collection pad beneath and/or adjacent the electrocution zone, within an insect collection zone, the collection pad having an adhesive, for attachment to a corresponding surface.

9. The device of claim 8, wherein the insect collection pad further comprising at least one of:
an impregnated attractant odor composition; and
an impregnated odor scent.

10. The device of claim 1 further comprising a heat source configured to generate a wavelength recognizable to an insect approaching or traversing the traction-enabling surface toward the entry zone.

* * * * *